(12) United States Patent
Rothman et al.

(10) Patent No.: US 8,620,749 B2
(45) Date of Patent: Dec. 31, 2013

(54) CUSTOMIZED OFFERS FOR E-COMMERCE

(75) Inventors: Simon Rothman, Palo Alto, CA (US); Michael McLaughlin, Menlo Park, CA (US)

(73) Assignee: Glyde Corporation, Palo Alto, CA (US)

( * ) Notice: Subject to any disclaimer, the term of this patent is extended or adjusted under 35 U.S.C. 154(b) by 30 days.

(21) Appl. No.: 13/164,385

(22) Filed: Jun. 20, 2011

(65) Prior Publication Data
US 2012/0323684 A1 Dec. 20, 2012

(51) Int. Cl.
*G06Q 30/00* (2012.01)

(52) U.S. Cl.
USPC ...................................................... 705/14.53

(58) Field of Classification Search
USPC ...................................................... 705/14.53
See application file for complete search history.

(56) References Cited

U.S. PATENT DOCUMENTS

| | | | |
|---|---|---|---|
| 5,117,364 A | 5/1992 | Barns-Slavin et al. |
| 5,664,115 A | 9/1997 | Fraser |
| 6,131,087 A | 10/2000 | Luke et al. |
| 6,463,420 B1 | 10/2002 | Guidice et al. |
| 6,490,567 B1 | 12/2002 | Gregory |
| 6,564,213 B1 | 5/2003 | Ortega et al. |
| 6,598,027 B1 | 7/2003 | Breen et al. |
| 6,714,922 B1 | 3/2004 | Sansone et al. |
| 6,772,130 B1 | 8/2004 | Karbowski et al. |
| 6,839,690 B1 | 1/2005 | Forth et al. |
| 7,111,252 B1 | 9/2006 | Harris |
| 7,155,663 B2 | 12/2006 | Landsman et al. |
| 7,197,475 B1 | 3/2007 | Lorenzen et al. |
| 7,254,774 B2 | 8/2007 | Cucerzan et al. |
| 7,266,513 B2 | 9/2007 | Chalmers et al. |
| 7,373,313 B1 | 5/2008 | Kahle et al. |
| 7,418,410 B2 | 8/2008 | Caiafa |
| 7,447,678 B2 | 11/2008 | Taylor et al. |
| 7,497,369 B2 | 3/2009 | Dalzell et al. |
| 7,580,863 B2 | 8/2009 | Broussard et al. |
| 7,610,233 B1 | 10/2009 | Leong et al. |
| 7,630,919 B1 | 12/2009 | Obrecht |
| 7,711,604 B1 | 5/2010 | Walker et al. |
| 7,774,234 B1 | 8/2010 | Kopelman et al. |
| 7,778,878 B2 | 8/2010 | Harding et al. |
| 7,792,704 B2 | 9/2010 | Harding et al. |
| 7,877,330 B2 | 1/2011 | Siegel et al. |
| 2001/0032116 A1 | 10/2001 | Hyatt |
| 2001/0034631 A1 | 10/2001 | Kiselik |
| 2001/0037261 A1 | 11/2001 | Ishitsuka |
| 2001/0054008 A1 | 12/2001 | Miller et al. |

(Continued)

OTHER PUBLICATIONS

Office Action for U.S. Appl. No. 11/963,711, mailed on Oct. 27, 2011, 21 pages.

(Continued)

*Primary Examiner* — Daniel Sorkowitz
(74) *Attorney, Agent, or Firm* — Kilpatrick Townsend & Stockton LLP

(57) ABSTRACT

Systems, apparatuses, and methods are provided for facilitating electronic commerce via a web banner. Entire purchase transactions may be provided via the web banner, where an end user purchases products sold from third parties via the web banner. Entire sale listing transactions may also be provided via the web banner, where an end user lists products for sale via the web banner. Further, users may be identified when they access third party web sites, and customized offers may be generated and communicated to the identified users.

25 Claims, 22 Drawing Sheets

(56) References Cited

U.S. PATENT DOCUMENTS

| | | |
|---|---|---|
| 2002/0002527 A1 | 1/2002 | Holtzman |
| 2002/0032668 A1 | 3/2002 | Kohler et al. |
| 2002/0107820 A1 | 8/2002 | Huxter |
| 2002/0107861 A1 | 8/2002 | Clendinning et al. |
| 2002/0113815 A1 | 8/2002 | DeGross |
| 2003/0020758 A1 | 1/2003 | Hinderks |
| 2003/0023499 A1 | 1/2003 | Das et al. |
| 2003/0023500 A1 | 1/2003 | Boies et al. |
| 2003/0033292 A1 | 2/2003 | Meisel et al. |
| 2003/0061147 A1 | 3/2003 | Fluhr et al. |
| 2003/0065573 A1 | 4/2003 | Nagel et al. |
| 2003/0105682 A1 | 6/2003 | Dicker et al. |
| 2003/0182222 A1 | 9/2003 | Rotman et al. |
| 2003/0200156 A1* | 10/2003 | Roseman et al. ............... 705/27 |
| 2003/0204447 A1 | 10/2003 | Dalzell et al. |
| 2003/0229552 A1 | 12/2003 | Lebaric et al. |
| 2004/0088328 A1 | 5/2004 | Cook et al. |
| 2004/0193436 A1 | 9/2004 | Stashluk et al. |
| 2005/0004889 A1 | 1/2005 | Bailey et al. |
| 2005/0071249 A1 | 3/2005 | Nix et al. |
| 2005/0102202 A1 | 5/2005 | Linden et al. |
| 2005/0144052 A1 | 6/2005 | Harding et al. |
| 2005/0192893 A1 | 9/2005 | Keeling et al. |
| 2005/0267774 A1 | 12/2005 | Merritt et al. |
| 2006/0069616 A1* | 3/2006 | Bau ................................ 705/14 |
| 2006/0085272 A1 | 4/2006 | Case et al. |
| 2006/0117256 A1 | 6/2006 | Miller et al. |
| 2006/0190379 A1 | 8/2006 | Maas et al. |
| 2006/0212355 A1* | 9/2006 | Teague et al. ................... 705/14 |
| 2006/0265259 A1 | 11/2006 | Diana et al. |
| 2007/0028185 A1 | 2/2007 | Bhogal et al. |
| 2007/0083440 A1 | 4/2007 | Wirtz et al. |
| 2007/0208635 A1 | 9/2007 | Van Luchene et al. |
| 2007/0255644 A1 | 11/2007 | Elder |
| 2008/0040323 A1 | 2/2008 | Joshi |
| 2008/0109327 A1 | 5/2008 | Mayle et al. |
| 2008/0114807 A1 | 5/2008 | Sembower |
| 2008/0235042 A1 | 9/2008 | Boyd et al. |
| 2008/0288368 A1 | 11/2008 | Marks et al. |
| 2009/0064056 A1 | 3/2009 | Anderson et al. |
| 2009/0132270 A1 | 5/2009 | Baptiste |
| 2009/0164315 A1* | 6/2009 | Rothman ......................... 705/14 |
| 2009/0248494 A1* | 10/2009 | Hueter et al. ................... 705/10 |
| 2009/0276522 A1 | 11/2009 | Seidel |
| 2010/0010918 A1 | 1/2010 | Hunt |
| 2010/0023311 A1 | 1/2010 | Subrahmanian et al. |
| 2010/0174606 A1* | 7/2010 | Hoyle ......................... 705/14.52 |
| 2011/0078232 A1 | 3/2011 | Van Den Driessche |
| 2011/0184834 A1 | 7/2011 | Perrochon et al. |
| 2011/0238524 A1 | 9/2011 | Green et al. |

OTHER PUBLICATIONS

Notice of Allowance for U.S. Appl. No. 11/963,711, mailed on Apr. 17, 2012, 15 pages.
Office Action for U.S. Appl. No. 11/963,718, mailed on Oct. 19, 2011, 21 pages.
Office Action for U.S. Appl. No. 11/963,382, mailed on Mar. 28, 2012, 20 pages.
Notice of Allowance for U.S. Appl. No. 11/963,382, mailed on Oct. 29, 2012, 15 pages.
Notice of Allowance for U.S. Appl. No. 11/963,382, mailed on Jan. 24, 2013, 17 pages.
Office Action for U.S. Appl. No. 11/963,675, mailed on Jun. 15, 2012, 18 pages.
Office Action for U.S. Appl. No. 12/906,013, mailed on Jul. 12, 2012, 14 pages.
Office Action for U.S. Appl. No. 11/963,470, mailed on Aug. 1, 2012, 26 pages.
Office Action for U.S. Appl. No. 13/555,294, mailed on Nov. 9, 2012, 23 pages.
Amazon.com, http://www.amazon.com/, Internet Archive (Nov. 7, 2007)—http://web.archive.org/web/20071107075225rn_1/www.amazon.com/, retrieved from the Internet on Mar. 25, 2011, 14 pages.
Smith, Michael D., "The Impact of Shopbots on Electronic Markets", Journal of the Academy of Marketing Science, vol. 30, No. 4, Fall 2002, pp. 446-454.
Office Action for U.S. Appl. No. 12/906,013, mailed on Sep. 6, 2013, 14 pages.
Office Action for U.S. Appl. No. 13/164,353, mailed on Sep. 9, 2013, 18 pages.
International Search Report and Written Opinion corresponding to the PCT application No. PCT/US08/86960, date of mailing Apr. 7, 2009, 14 pages total.
"GoShip.com Launches Service That Empowers Online Buyers to Choose Parcel Shipping Method and Allows Merchants to Cut Losses"; PR Newswire; (Apr. 3, 2000).
Office Action for U.S. Appl. No. 11/963,675, mailed Sep. 24, 2010.
Office Action for U.S. Appl. No. 11/963,675, mailed Jun. 9, 2011.
Office Action for U.S. Appl. No. 11/963,382, mailed on Jun. 25, 2009.
Office Action for U.S. Appl. No. 11/963,382, mailed on Nov. 27, 2009.
Office Action for U.S. Appl. No. 11/963,382, mailed on Jun. 25, 2010.
Office Action for U.S. Appl. No. 11/963,382, mailed on Jan. 3, 2011.
Office Action for U.S. Appl. No. 11/963,711, mailed on Jan. 25, 2011.
Office Action for U.S. Appl. No. 11/963,718, mailed on Apr. 6, 2011.
Office Action for U.S. Appl. No. 11/963,470, mailed on Aug. 18, 2010.
Office Action for U.S. Appl. No. 11/963,470, mailed on May 12, 2011.
Office Action for U.S. Appl. No. 11/963,592, mailed on Feb. 2, 2010.
Notice of Allowance for U.S. Appl. No. 11/963,592, mailed on Sep. 16, 2010.
Office Action for U.S. Appl. No. 11/963,601, mailed on Sep. 14, 2010.
Notice of Allowance for U.S. Appl. No. 11/963,601, mailed on Dec. 17, 2010.

* cited by examiner

CUSTOMIZED OFFERS FOR E-COMMERCE

BACKGROUND

The present invention relates to buying and selling products on the Internet, and in particular to providing customized offers for e-commerce.

When purchasing goods, most websites follow a model popularized by Amazon.com and others. The user first selects a product to purchase from a product webpage then must navigate through checkout pages on separate web pages. Similarly, when selling goods, a user may create a website or go to a website such as eBay.com to list his product for sale. The requirement of navigating through numerous checkout pages can often be tedious and the requirement to go to a particular website to make a sale or purchase fails to actively entice users of web browsers to consume goods.

Ads take many forms on the internet. Typically, a "banner ad" is a rectangular graphic element on a webpage and has artwork and a product description along with a hyperlink. If the user clicks on the ad, the user is taken to the website offering the product or service. There are also other types of ads, such as pop-up ads, ads that incorporate video, pop-under ads and floating ads. These ads typically describe one product or service, or a class of products or services. There are also dynamically alterable banner ads. These ads can scroll either horizontally or vertically.

A number of techniques exist for providing ads in web pages. A banner ad is generally produced by embedding HTML code for that banner within the HTML coding for a given web page. Consumers can obtain more information by clicking through the ad, thus being referred to the advertiser's site, and click through counts can be monitored. Interstitial ads are displayed in an interval of time that occurs after a user has clicked on a hot-link displayed by a browser to retrieve a desired web page but before that browser has started rendering that page. Ads can also be provided via a "push" application program that connects with a server, typically during off-hours. Ads are downloaded for later display. A user profile is used to determine the type of ads for that user. Real-time downloading and rendering of advertising HTML files uses advertising files stored on remote web servers. These ads show content in a "streamed" media file that relies on a continuous real-time network connection existing to a remote web server.

While banner ads often attempt to entice users of web browsers to consume goods, they often fall short since they require users to be taken to other websites and typically engage in numerous web page transitions to purchase a good. The end result is that the conversion rate is lower than it otherwise could be because of these traditional requirements.

BRIEF SUMMARY

Embodiments of the present invention overcome some or all of the aforementioned deficiencies in the related art. According to one embodiment, a marketplace server performs at least one functionality for enabling an end user to purchase or sell a product via a web banner. The functionality may include all of the functionality necessary to engage in and complete such transactions, including performing fraud checks, financial transactions, and causing shipment. Compared to technologies where such functionality is disseminated between multiple parties, such as a where one party obtains transaction information from end users and subsequently passes the transaction information to another party such as a retailer, the functionality discussed with reference to the marketplace server may increase efficiencies in information processing, reduce complexities regarding managing and communicating consumer information, and increase transaction speeds.

According to one embodiment, a marketplace server may perform at least one functionality for enabling an end user to purchase a product via a web banner. For example, the marketplace server may provide product information including a description of a product and a price of the product for display in a web banner. In response to a user input via a buyer computer activating the web banner, the marketplace server may receive a product purchase request from the buyer computer. The marketplace server may then process the product purchase request. For example, the marketplace server may perform a fraud check on the buyer, perform a financial transaction for a price of the product, and cause the product to be shipped to the buyer. After processing the product purchase request, the marketplace server may provide confirmation of the purchase to the buyer via the web banner.

According to a further embodiment, a marketplace server may perform at least one functionality for enabling an end user to sell a particular product via a web banner. For example, the marketplace server may provide product information including a description of a product and a suggested sale price of the product for display in a web banner. In response to a user input via a seller computer activating the web banner, the marketplace server may receive a product sale request from the seller computer. The marketplace server may then process the product sale request, and provide confirmation of the product sale request to the seller computer via the web banner.

According to another embodiment, a marketplace server may perform at least one functionality for enabling an end user to search for a product to sell via a web banner. For example, the marketplace server may receive a product sale request from a seller computer via the web banner, where the product sale request includes a product identifier. The marketplace server may then process the product sale request, and provide confirmation of the product sale request to the seller computer via the web banner.

According to yet another embodiment, a marketplace server may acquire information about a user of an end user computing device. For example, the marketplace server may acquire various types of information about a particular user, such as demographic information, behavioral information, and product interest information. Marketplace server may then identify the user when the user accesses a third party web site, and then generate a customized offer for the user. For example, the customized offer may be for the sale or purchase of a product, and may be generated using at least some of the acquired information. The offer may then be communicated to the user.

In some embodiments, the customized offer may be provided to the user via a web banner. In the event the user accepts the offer, subsequent transaction processing may also all be performed within the web banner. For example, the end user may purchase or sell a product subject to the offer within the web banner. By combining customized offers with the ability to complete a transaction within a web banner, a powerful product merchandising tool is provided.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

A further understanding of the nature and advantages of the invention may be realized by reference to the remaining portions of the specification and the drawings, presented below. The Figures are incorporated into the detailed description portion of the invention.

DETAILED DESCRIPTION

Figure 1:
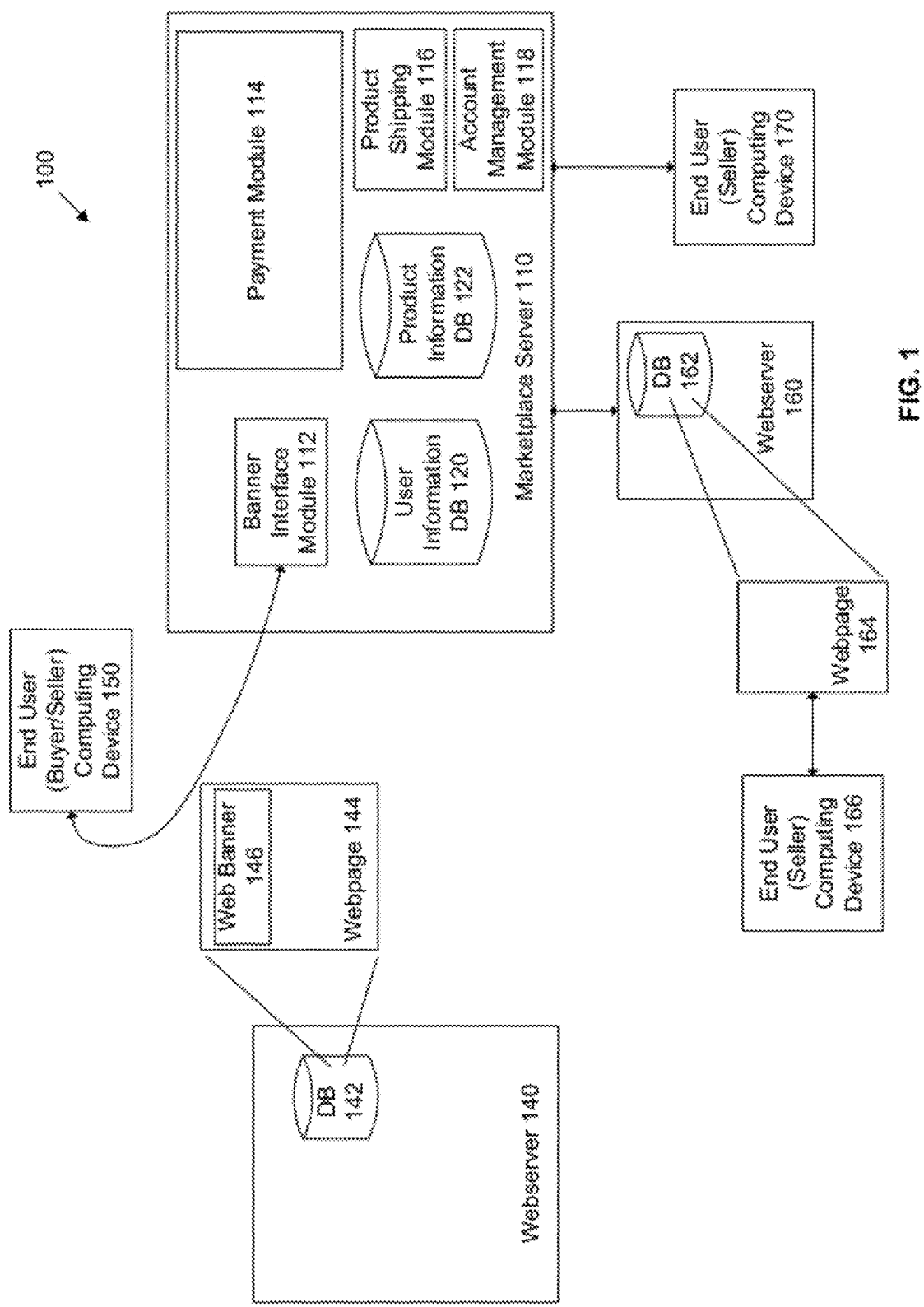
FIG. 1 is a simplified e-commerce system for supporting embodiments of the present invention.

Embodiments of the present invention provide systems, apparatuses, and methods for facilitating e-commerce via a banner ad. According to one embodiment, a marketplace server performs at least one functionality for enabling an end user to purchase or sell a product via a web banner. The functionality may include all of the functionality necessary to engage in and complete such transactions, including performing fraud checks, financial transactions, and causing shipment. Compared to technologies where such functionality is disseminated between multiple parties, such as a where one party obtains transaction information from end users and subsequently passes the transaction information to another party such as a retailer, the functionality discussed with reference to the marketplace server may increase efficiencies in information processing, reduce complexities regarding managing and communicating consumer information, and increase transaction speeds.

Banner ads according to embodiments of the present invention may allow a user operating an end user computing device to engage in and complete transactions within the banner ad. For example, the banner ad may advertise a product to be sold by a third party. In such a case, the user may click on the banner ad to purchase the product, enter purchase-related information such as mailing address and credit card information into the banner ad, and receive a confirmation of purchase within the banner ad. As a result, an entire product purchase transaction may occur within the banner ad.

For another example, the banner ad may solicit sales of a product from the user operating the end user computing device. In such a case, the user would be a seller rather than a buyer, where the seller lists an item for sale via the banner ad. According to one embodiment, the banner ad may solicit sales of a specific product. For example, the banner ad may identify a particular product by providing an image of the product and/or a description of the product, and may include a suggested sale price of the product. The user may click on the banner ad to sell the product, enter sale-related information such as credit card information and a condition of the product into the banner ad, and receive a confirmation that the user's product will be listed for sale. According to another embodiment, the banner ad may generally solicit sales of any product. For example, the banner ad may include a search box allowing the user to search for a product to sell. If the search finds the searched-for product, the user may then enter sale-related information into the banner ad. If the search does not find the searched-for product, the user may then add a new product to a product database.

When the banner ad solicits sales of a product from the user operating the end user computing device, the user provides information for listing the product for sale. Such information, once submitted, may then be pushed out to other users via other banner ads. Accordingly, while one user may list a product for sale by the user via a banner ad, another user, via another banner ad, may view that listing. In some cases, the banner ad that advertises a product to be sold to the user may show all of the listings associated with that product, including listings from numerous sellers, and including listings for various conditions of the product, such as new or used. In some cases, the banner ad may show a listing having the lowest price for the advertised product.

In some embodiments, a customized offer may be provided to a user. The marketplace server may store information about a number of users, and may identify one of the users when they access a third party web site. The marketplace server may then generate a customized offer for that user, and communicate it to the user. In such a fashion, users surfing anywhere on the Internet may be provided with customized offers for the purchase or sale of products. In some embodiments, this customer targeting and customized offers may be combined with transaction processing within a web banner. Such a combination may advantageously increase the likelihood of the user engaging and completing a product purchase or sale.

In this fashion, banner ads may be used to facilitate e-commerce in a multi-seller and multi-buyer environment. Such functionality may advantageously enable users to engage and finalize product purchases and product sale listings without leaving a host website and without visiting a website dedicated to facilitating such transactions. Such functionality may also advantageously push purchase and sale opportunities to Internet users so as to entice the users to engage in such transactions. Such functionality may also further encourage users to purchase or sell products via time-limited, customized offers.

System for Facilitating Web Banner Commerce

FIG. 1 is a simplified e-commerce system 100 for supporting embodiments of the present invention. System 100 includes a marketplace server 110, a webserver 140, and an end-user computing device 150, all interconnected via a communication network such as the Internet.

Marketplace server 100 may be a single computer server or a network of computing devices. Marketplace server 100 may include tangible non-transitory storage media that has computer code stored thereon. The computer code may include various modules. For example, marketplace server 100 may include a banner interface module 112, a payment module 114, a product shipping module 116, and an account management module 118. Marketplace server 110 may also include one or more databases for storing various information, such as a user information database 120 and a product information database 122.

Webserver 140 may be a single computer server or a network of computing devices, operated by a third party independent from marketplace server 110. Webserver 140 may include tangible non-transient storage media that has computer code stored thereon. Webserver 140 may also include a database 142 for storing various information. Webserver 140 may cause a webpage 144 to be displayed on a display of end user (buyer/seller) computing device 150.

In general, a buyer or seller may use end user computing device 150 to browse webpage 144 hosted by webserver 140. Webpage 144 may include a web banner 146, where advertising content for web banner 146 may be provided by marketplace server 110, webserver 140, or a third party device or network such as an ad network. An end user may engage in and complete entire transactions within web banner 146. For example, web banner 146 may advertise a product to be sold by a third party. Information about the product and the party may be stored in marketplace server 110. In such a case, a buyer may use end user computing device 150 to activate web banner 146 to purchase the product, to enter purchase-related information such as mailing address and credit card information into web banner 146, and to receive a confirmation of purchase via web banner 146.

For another example, web banner 146 may solicit sales of a product from the end user operating end user computing device 150. In such a case, the user would be a seller rather than a buyer, where the seller lists an item for sale via web banner 146. According to one embodiment, web banner 146 may be used to solicit sales of a specific product. For example, web banner 146 may identify a particular product by providing an image of the product and/or a description of the product, and may include a suggested sale price of the product. The end user may click on web banner 146 using end user computing device 150 to sell the product, enter sale-related information such as credit card information and a condition of the product into web banner 146, and receive a confirmation from web banner 146 that the user's product will be listed for sale. According to another embodiment, web banner 146 may be used to generally solicit sales of any product. For example, web banner 146 may include a search box allowing the user of end user computing device 150 to search product information database 122 for a product to sell. If the search finds the searched-for product, the user may then enter sale-related information into web banner 146. If the search does not find the searched-for product, the user may then add a new product to product information database 122.

Further details of such functionality are described below with reference to FIGS. 2A to 5D.

The aforementioned functionality may be enabled, at least in part, by marketplace server 110. In this regard, banner interface module 112 of marketplace server 110 may enable marketplace server 110 to interface with banner 146. For example, banner interface module 112 may include an application programming interface (API) allowing activation of elements of banner 146 to execute functionality of marketplace server 110, and/or allowing data entry into banner 146 to be passed through to marketplace server 110. Such communication between banner interface module 112 and other devices, such as webserver 140 and/or end user computing device 150, may be over a secure connection. Payment module 114 may perform at least one payment-related functionality as described below, such as user authentication and credit or debit card authorization. Product shipping module 116 may perform at least one product shipping-related functionality as described below, such as causing a product to be shipped to a buyer. Account management module 118 may perform at least one account management functionality as described below, such as executing user login procedures. User information database 120 may store various information concerning buyers and sellers, while product information database 122 may store various information concerning products to be purchased or sold. User information database 120 and product information database 122 may be provided separately or as a single database.

As briefly described, a seller may use end user computing device 150 to provide, to marketplace server 110 via web banner 146, information concerning a product to be sold by the seller. However, in some embodiments, a seller may provide information concerning products to be sold via other mechanisms.

For example, e-commerce system 100 may further include webserver 160. Webserver 160 may be a single computer server or a network of computing devices, operated by a third party independent from marketplace server 110 or operated by the same operators of marketplace server 110. Webserver 160 may include tangible non-transient storage media that has computer code stored thereon. Webserver 160 may also include a database 162 for storing various information. Webserver 160 may cause a webpage 164 to be displayed on a display of end user (seller) computing device 166. Webpage 164 may enable a user of end user computing device 166 to submit information concerning products to be sold to marketplace server 110. In one embodiment, webserver 160 is operated by the same operators of marketplace server 110, and webpage 164 includes various fields for receiving such information from end user computing device 166. In another embodiment, webserver 160 is operated by operators different from those of marketplace server 110, and webpage 164 includes an in-line store in communication with marketplace server 110.

For another example, e-commerce system 100 may further include end-user (seller) computing device 170. End-user computing device 170 may be in direct communication with marketplace server 110, and be capable of providing information directly to marketplace server 110. For example, end-user computing device 170 may be used by a professional seller that communicates user and product information to marketplace server via an API or via a file transfer protocol (FTP).

Processes for Selling Products to End Users

Figure 2A:
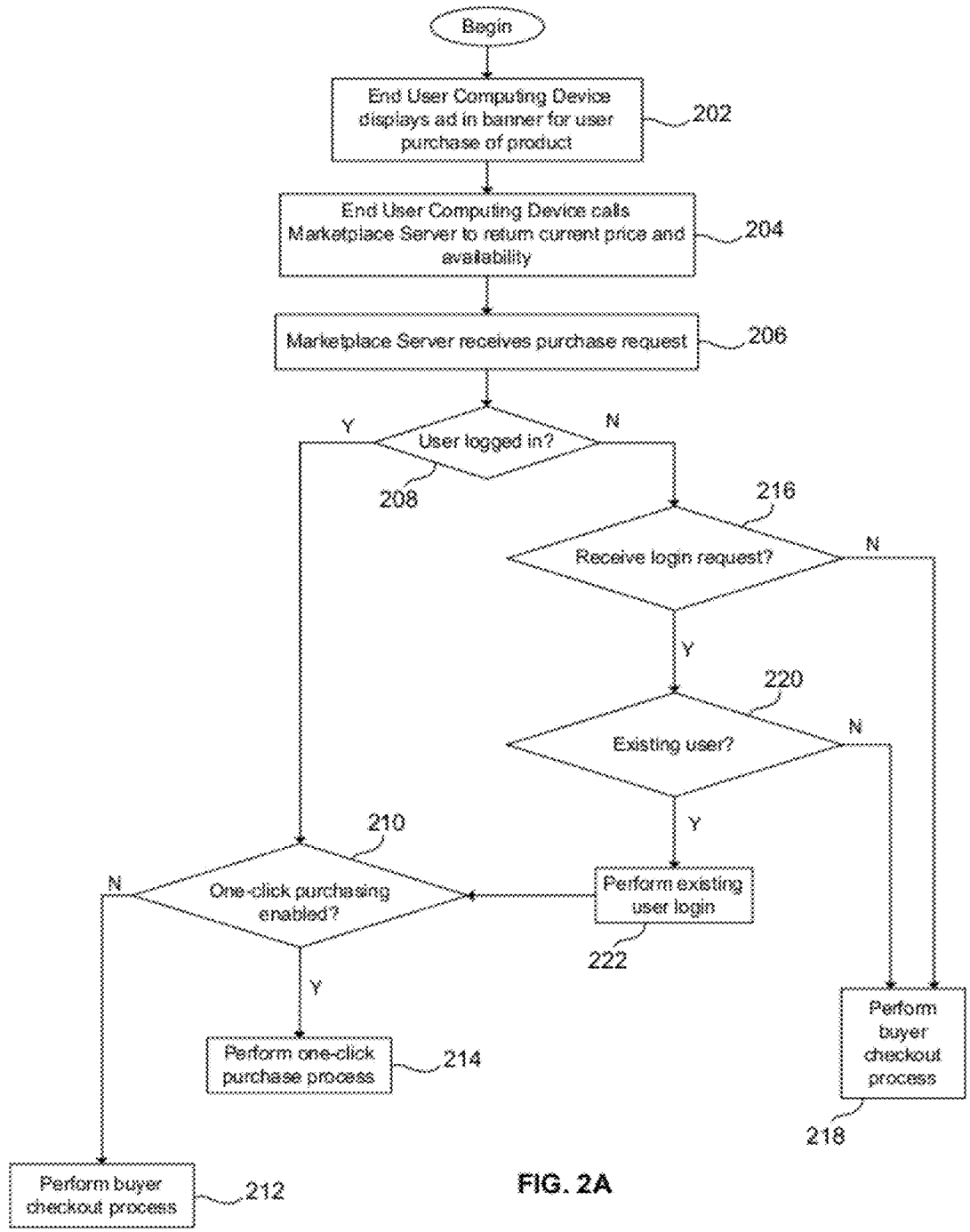
FIG. 2A is a flowchart illustrating a method for enabling a user to purchase a product via a web banner.

FIG. 2A is a flowchart illustrating a method for enabling a user to purchase a product via a web banner. In operation 202, end user computing device 150 displays an advertisement in a web banner 146 for a user of end user computing device 150 to purchase a product. The advertisement may include various information, such as an image of a product to be sold, a textual description of the product to be sold, a sale price for the product to be sold, and the like. The information for the web banner 146 may be provided by any one of numerous sources. For example, the information may be stored in product information database 122 of marketplace server 110, and provided by marketplace server. For another example, the information may be stored in and provided by a third party advertising network (not illustrated). For yet another example, the information may be stored in and provided by webserver 140.

The advertisement may advertise products for sale by any type of party, and marketplace server may store associations between the advertised products and the parties selling such products. For example, the operator of marketplace server 110 may wish to sell a product, and thus the advertised product may be associated with information identifying the operator of marketplace server 110. For another example, an end user may wish to sell a product, and thus the advertised product may be associated with information identifying the end user. The products advertised may be new products or previously used products, and the information advertising such products may include information identifying whether the product is new or used.

The advertisement may advertise products for sale by any number of parties. For example, a particular product may be advertised for sale by a plurality of end users. For another example, a particular product may be advertised for sale by a plurality of end users as well as an operator of marketplace server. In this fashion, a multi-buyer, multi-seller marketplace is formed.

In operation 204, end user computing device 150 calls marketplace server 110 to return a current price and availability for an advertised product. In one embodiment, end user computing device 150 may make such a call automatically when the banner loads. In another embodiment, end user computing device 150 may make such a call by, for example, activating a button labeled "Current Price and Availability" on banner 146. Activation of such a button may cause end user computing device 150 to make an API call to marketplace server 110. The API call may include an identifier identifying the product being advertised. In response to receiving such a request, marketplace server 110 may search product information database 122 for a current price and availability of the advertised product, and return such information to end user computing device 150.

The current price may be any price selected by marketplace server 110. For example, the current price may be a minimum of all prices for the product stored in the product information database 122. For another example, the current price may be a minimum of all prices for the product taking into account shipping charges. In one embodiment, the current price may be selected as discussed in United States Patent Publication No. 2009/164338, which is commonly assigned and incorporated by reference herein in its entirety.

In operation 206, marketplace server 110 receives a purchase request from end user computing device 150. End user computing device 150 may make such a request by, for example, activating a button labeled "Buy Now" on banner 146. Activation of such a button may cause end user computing device 150 to make an API call to marketplace server 110. The API call may include an identifier identifying the product being advertised. In response to receiving such a request, marketplace server 110 may begin processing the purchase request. In some embodiments, the purchase request is a request to acquire full ownership of a product. However, other embodiments are not so limited. For example, the purchase request may be a request to license a product. For another example, the purchase request may be a request for a free trial of a product. For yet another example, the purchase request may be a request for a promotional giveaway. For a further example, the purchase request may be a request to 'sign up' for something, such as to receive special promotional emails, or to receive more information about a particular product.

In operation 208, marketplace server 110 begins processing the purchase request. Marketplace server 110 begins by determining whether the user of end user computing device 150 is logged in to marketplace server 110. Marketplace server 110 may make such a determination by, for example, checking to see whether a particular cookie is stored on end user computing device 150. In some embodiments, whenever a user is logged into marketplace server 110, marketplace server 110 causes end user computing device 150 to store a unique cookie on end user computing device 150. If user logs off, the unique cookie may be removed. The existence of the unique cookie may thus indicate whether the user of end user computing device 150 is logged in to marketplace server 110.

In the event the user of end user computing device 150 is logged in to marketplace server 110, processing proceeds to operation 210. In operation 210, marketplace server 110 determines whether one-click purchasing is enabled for the user. Such a preference may be stored in the unique cookie, or stored in user information database 120, or stored elsewhere.

If one-click purchasing is not enabled for the user, processing proceeds to operation 212, in which a buyer checkout process is performed. The buyer checkout process is further described with reference to FIG. 2B. If, on the other hand, one-click purchasing is enabled, processing proceeds to operation 214, in which a one-click purchase processing is performed. One-click purchase processing is further described with reference to FIG. 2C. In some embodiments, one-click purchasing is always enabled. Accordingly, no decision is made as to whether one-click purchasing is enabled, and processing automatically proceeds to operation 214 after marketplace server determines that a user is logged in.

In the event the user of end user computing device 150 is not logged in to marketplace server 110, processing proceeds to operation 216. In operation 216, marketplace server 110 determines whether a login request has been received. For example, a button labeled "Login" may be provided on banner 146. Activation of such a button may cause end user computing device 150 to make an API call to marketplace server 110. The API call may include a request to login. In response to receiving such a request, marketplace server 110 may determine that a login request has been received. In the absence of receiving such a request, marketplace server 110 may determine that a login request has not been received.

If marketplace server 110 does not receive a login request, processing may continue with operation 218. In operation 218, a buyer checkout process is performed. The buyer checkout process is further discussed with reference to FIG. 2B. If marketplace server 110 does receive a login request, processing may continue with operation 220. In operation 220, marketplace server 110 determines whether the user is an existing user. To make such a determination, the login request may include user identifying information, such as a user name. After receiving such user identifying information, marketplace server 110 may search user information database 120 for a match. If a match exists, marketplace server 110 determines that the user is an existing user, and processing may continue with operation 222. If a match does not exist, marketplace server 110 determines that user is not an existing user, and processing may continue with operation 218.

In operation 222, marketplace server 110 performs an existing user login process. According to this process, marketplace server 110 may receive and confirm login information for the user, such as a user name and password. For example, marketplace server 110 may search user information database 120 to determine whether a match exists in the database. If a match exists, then the login information is confirmed. If the login information is confirmed, marketplace server 110 may then access user information associated with the user stored in user information database 120; for example, marketplace server 110 may then access shipping information, payment information, etc.

Figure 2B:
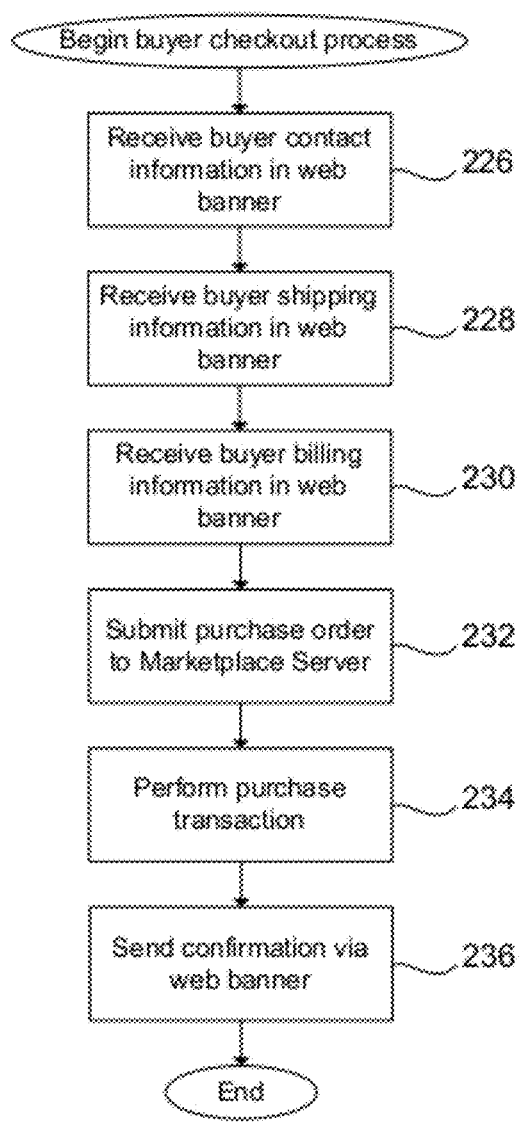
FIG. 2B is a flowchart illustrating a method for performing a buyer checkout process for enabling a user to purchase a product via a web banner.

FIG. 2B is a flowchart illustrating a method for performing a buyer checkout process for enabling a user to purchase a product via a web banner. In operation 226, end user computing device 150 receives buyer contact information via web banner 146. To facilitate such information gathering, web banner 146, while displayed on end user computing device 150, may include fields for receiving information from a user of end user computing device 150. The fields may include fields for receiving contact information, where contact information may include information for contacting the user. For example, contact information may include an email address associated with the user, a phone number associated with the user, a mailing address associated with the user, etc.

In operation 228, end user computing device 150 receives buyer shipping information via web banner 146. Similar to buyer contact information, buyer shipping information may be provided via fields included in web banner 146. The buyer shipping information may use the same or different fields as buyer contact information. Buyer shipping information may include information for shipping a product to the user. For example, buyer shipping information may include a mailing address associated with the user.

In operation 230, end user computing device 150 receives buyer billing information via web banner 146. Similar to buyer contact information, buyer billing information may be provided via fields included in web banner 146. The buyer billing information may use the same or different fields as buyer contact information and buyer shipping information. Buyer billing information may include information billing the user the purchase price of the product. For example, buyer billing information may include a credit card number, a billing address associated with a credit card, etc.

In operation 232, a purchase order is submitted to marketplace server 110. The purchase order may include the buyer contact, shipping, and billing information, as well as an identifier for identifying the product to be purchased. The purchase order may be communicated to marketplace server 110 from end user computing device 150 via calls to an API of marketplace server. In one embodiment, buyer contact, shipping, and billing information may be acquired in a single instance of web banner 146. For example, web banner 146 may simultaneously display fields for all of such information. Subsequently, all of such information may be simultaneously communicated to marketplace server 110 upon receiving a user input, such as activation of a "Continue" or "Buy Now" button displayed on web banner 146. In another embodiment, buyer contact, shipping, and billing information may be acquired in numerous instances of web banner 146. For example, web banner 146 may first display fields for acquiring buyer contact information. Upon receiving a user input, such as activation of a "Continue" button, the buyer contact information may be communicated to marketplace server 110, and a new instance of web banner 146 may display fields for acquiring buyer shipping information. Upon receiving a user input, such as activation of a "Continue" button, the buyer shipping information may be communicated to marketplace server 110, and another new instance of web banner 146 may display fields for acquiring buyer billing information. The billing information may then similarly be communicated to marketplace server 110.

In operation 234, marketplace server performs a purchase transaction. A purchase transaction process is further discussed with reference to FIG. 2D.

In operation 236, a confirmation of the product purchase is sent to the user via web banner 146. For example, if the purchase transaction process is performed successfully, web banner 146 may display information indicating a successful purchase. Otherwise, web banner 146 may display information indicating an unsuccessful purchase.

Figure 2C:
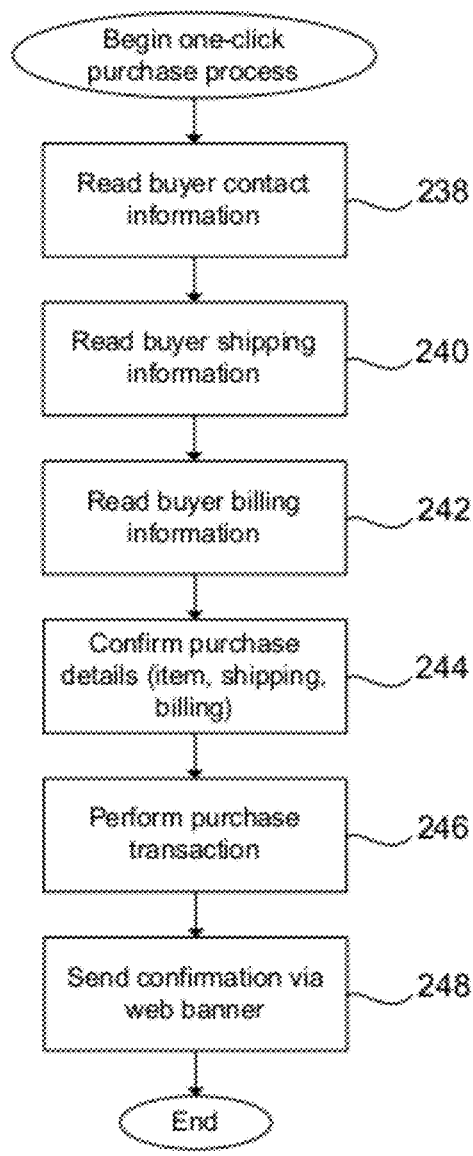
FIG. 2C is a flowchart illustrating a method for performing a one-click purchase process for enabling a user to purchase a product via a web banner.

FIG. 2C is a flowchart illustrating a method for performing a one-click purchase process for enabling a user to purchase a product via a web banner. According to a one-click purchase process in one embodiment, various processing may be performed in response to receiving a single user input such as activating a banner ad to submit a product purchase request. The processing may include, for example, marketplace server 110 receiving the purchase request as previously discussed with reference to operation 206, marketplace server 110 performing some or all of the processes subsequently discussed with reference to FIG. 2C, and marketplace server 110 performing some or all of the processes subsequently discussed with reference to FIG. 2D.

With respect to the processes illustrated in FIG. 2C, in operations 238, 240, and 242, marketplace server 110 respectively reads buyer contact, shipping, and billing information. For example, such information may be stored in user information database 120 during a new user login process, and subsequently read by marketplace server 110 from user information database 120. For another example, such information may be included in a cookie stored on end user computing device 150.

In operation 244, the product purchase details are confirmed. In confirming the product purchase details, marketplace server 110 may cause the purchase details to be displayed in web banner 146. Marketplace server 110 may then receive a user input confirming that the purchase details are correct. For example, web banner 146 may include a "Confirm" button that may be activated by end user computing device 150. Product purchase details may consist of various information concerning the product purchase; for example, they may include information concerning the product or item being purchased, the shipping address, and the billing information.

In operation 246, marketplace server 110 performs a purchase transaction. A purchase transaction process is further discussed with reference to FIG. 2D.

In operation 248, marketplace server 110 sends confirmation of the product purchase to the user via web banner 146 as discussed in operation 236.

Figure 2D:
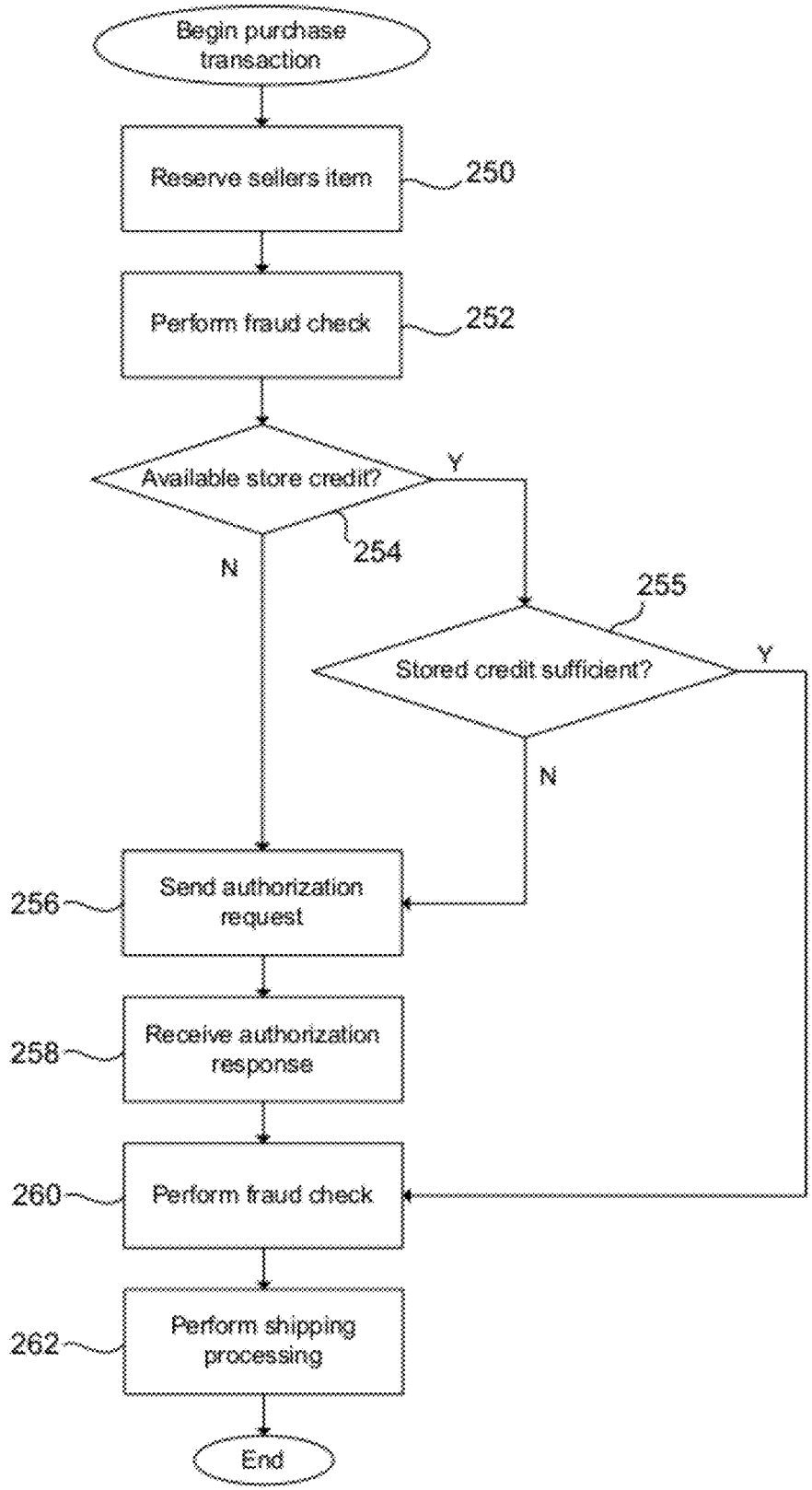
FIG. 2D is a flowchart illustrating a method for performing a purchase transaction for enabling a user to purchase a product via a web banner.

FIG. 2D is a flowchart illustrating a method for performing a purchase transaction for enabling a user to purchase a product via a web banner. In operation 250, marketplace server 110 reserves seller's item. For example, marketplace server 110 may place a hold on the product identified in the product purchase request. Such a hold may be implemented via, for example, a flag or numerical indicator indicating the number of product holds. The flag or numerical indicator may be stored in product information database 122 and associated with the product identified in the product purchase request.

In operation 252, marketplace server 110 performs a fraud check on the user of end user computing device 150. Marketplace server 110 may use the information submitted by end user to identify end user; for example, a login name, a user name associated with end user, a name associated with a payment type, etc. Marketplace server 110 may perform a variety of processes for engaging in fraud checks.

In operation 254, marketplace server 110 begins performing a financial transaction for a price of the product. For example, marketplace server 110 may determine whether there is any store credit available for the user of end user computing device 150. Marketplace server 110 may use the information submitted by end user to determine whether there is any store credit available for the user; for example, a login name, a user name associated with end user, a name associated with a payment type, etc. A user may acquire store credit in a variety of ways; for example, the user may purchase store credit, have store credit transferred from another user, have store credit gifted by an operator of marketplace server, have stored credit as a result of a sale of another product, etc. An indicator indicating an amount of store credit available for a particular user may be stored in user information database 120.

If marketplace server 110 determines that there is no store credit available for the user of end user computing device 150, processing may proceed to operation 256. In operation 256, marketplace server 110 sends an authorization request to a payment gateway for the full amount of the purchase price. The payment gateway may be operated by a bank, a credit card company, or the like. The authorization requests authorization to debit the purchase price from the particular account indicated by the user payment information.

In operation 258, marketplace server 110 receives an authorization response from the payment gateway. The authorization response indicates whether the debit of the purchase price from the particular account is authorized or not.

In operation 260, marketplace server 110 performs another fraud check. Similar to operation 252, marketplace server 110 may use the information submitted by end user to identify end user, and may perform a variety of processes for engaging in fraud checks. The processes may be the same or different than those used in operation 252.

In operation 262, marketplace server 110 performs a shipping process. The shipping process is further discussed with reference to FIG. 2E.

If marketplace server 110 determines that is store credit is available for the user of end user computing device 150, processing may proceed to operation 255. In operation 255, marketplace server 110 may determine whether the available store credit is sufficient to pay for the entire product purchase price. For example, marketplace server 110 may read the available store credit from user information database 120, and may read the product purchase price from product information database 122, where available store credit is associated with the user and the product purchase price is associated with the product selected for purchase. Marketplace server 110 may then compare the available store credit to the product purchase price to determine whether the available store credit is equal to or greater than the product purchase price.

If marketplace server 110 determines that the available store credit is insufficient to pay for the entire product purchase price, processing may proceed to operation 256 where marketplace server 110 may send an authorization request for the difference between available store credit and product purchase price. If, on the other hand, marketplace server 110 determines that the available store credit is sufficient to pay for the entire product purchase price, processing may proceed to operation 260, and the product purchase price may be deducted from the available store credit.

Figure 2E:
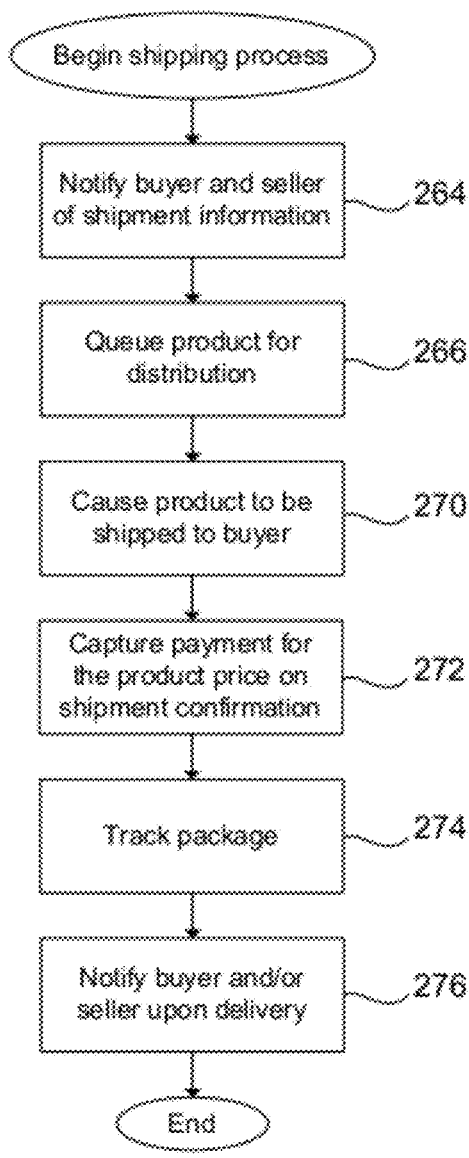
FIG. 2E is a flowchart illustrating a method for performing a shipping process for enabling a user to purchase a product via a web banner.

FIG. 2E is a flowchart illustrating a method for performing a shipping process for enabling a user to purchase a product via a web banner. In operation 264, marketplace server 110 may notify the buyer and seller of shipment information. Shipment information may include an indication of the product(s) to be shipped, the quantity of product(s) to be shipped, the means of shipment, the buyer address, the expected shipping time, etc. Any type of notification may be used; for example, marketplace server 110 may email the information to each of the buyer and seller, send a letter via a postal office to the buyer and seller, establish a telephone communication with each of the buyer and seller, etc. Marketplace server 110 may acquire the relevant information from a variety of sources, such as the user information database 120, product information database 122, and previously discussed purchase order.

In operation 266, marketplace server 110 queues the product identified in the purchase order for distribution. For example, where the product is being sold by an operator of marketplace server 110, this may include sending a product delivery request to a shipping server (not illustrated) that functions to receive and process product delivery requests.

In operation 270, marketplace server 110 causes the product to be shipped to the buyer. For example, where the product is being sold by an operator of marketplace server 110, shipping server (not illustrated) may send notifications to employees of the operator to notify the employees to ship the product. For another example, where the product is being sold by a party independent of an operator of marketplace server 110, marketplace server 110 may send order and delivery information (such as an indication of the product purchased, an address of the buyer, etc.) to the seller. For yet another example, where the product is being sold by a party independent of an operator of marketplace server 110, marketplace server 110 may cause a packing kit to be sent to the seller. The packing kit may include, for example, an envelope for mailing the product, where the envelope includes the address of the buyer and the appropriate postal fees.

In operation 272, marketplace server 110 captures payment for the product price on receiving a confirmation of the shipment. Capturing payment may include transferring the authorized funds to an account associated with marketplace server 110. Shipment may be confirmed, for example, once the product is placed into a postal system.

In operation 274, marketplace server 110 tracks the package in which the product is mailed. For example, marketplace server 110 may receive and store a postal tracking number associated with the package, and receive and store information identifying a location of the package as the package is shipped from the seller to the buyer.

In operation 276, marketplace server 110 notifies the buyer and/or seller upon delivery of the product to the buyer. Marketplace server 110 may identify when the product is delivered to the buyer using, for example, received information identifying a location of the package in which the product is mailed. Once the location of the package matches the stored address of the buyer, marketplace server 110 may notify the buyer and/or seller that the product has successfully been delivered.

The processes discussed with reference to FIGS. 2A to 2E include various individual but functionally related processes, many of which are neither essential nor necessary to embodiments of the present invention. Further, the order of processing described with reference to FIGS. 2A to 2E is neither essential nor necessary. For example, in some embodiments, a current price and availability may be returned after marketplace server 110 receives a purchase request. For another example, one or more fraud checks may not be performed. For yet another example, marketplace server 110 may not provide store credit.

Processes for Soliciting Product Sales from End Users

Figure 3A:
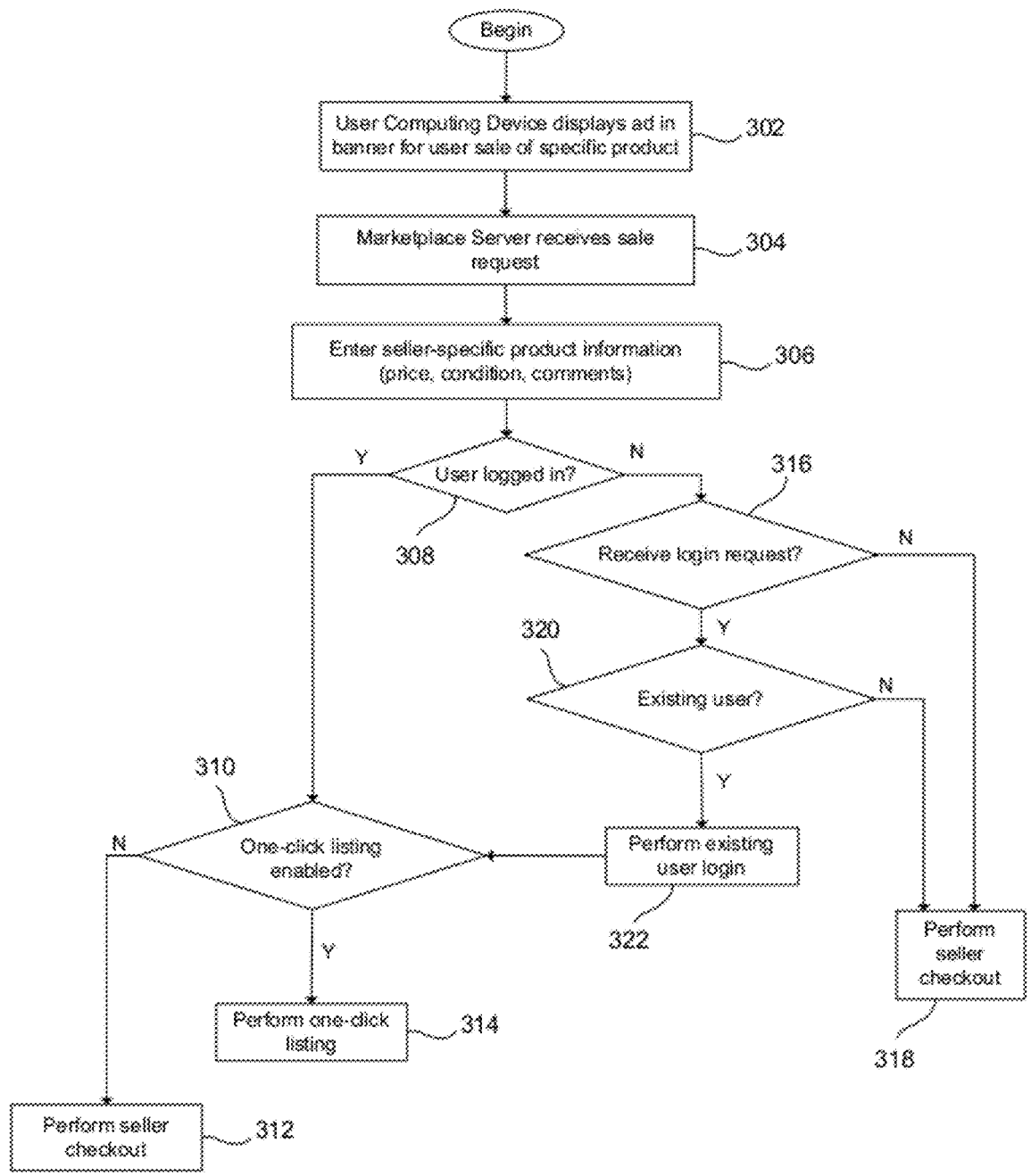
FIG. 3A is a flowchart illustrating a method for enabling a user to sell a specifically advertised product via a web banner.

FIG. 3A is a flowchart illustrating a method for enabling a user to sell a specifically advertised product via a web banner. In operation 302, end user computing device 150 displays an advertisement in a web banner 146 for a user of end user computing device 150 to sell a product. The advertisement may include various information, such as an image of a product which the user may sell, a textual description of the product, a suggested sale price for the product to be sold, and the like. The information for the web banner 146 may be provided by any one of numerous sources. For example, the information may be stored in product information database 122 of marketplace server 110, and provided by marketplace server. For another example, the information may be stored in and provided by a third party advertising network (not illustrated). For yet another example, the information may be stored in and provided by webserver 140.

The suggested sale price may be a price suggested to the user as a price at which the user may sell the product. The suggested sale price may be determined by marketplace server 110. Marketplace server 110 may employ a variety of techniques for determining the suggested sale price. For example, marketplace server 110 may identify and use the average price for the product from a number of pricings for the product stored in product information database 122. The number of pricings may correspond to the same product being sold by different sellers.

In operation 304, marketplace server 110 receives a sale request from end user computing device 150. Such a request is similar to that described with reference to operation 206, but is directed to the sale rather than purchase of a product, and as such may utilize a button labeled "Sell Now" rather than "Buy Now."

In operation 306, marketplace server 110 begins processing the sale request. Marketplace server 110 begins by receiving seller-specific product information. As a precursor, general product information may already be stored in product information database 122. General product information may include, for example, an image associated with the product, a general description of the product, etc. Marketplace server 110 may then receive seller-specific product information via web banner 146. For example, web banner 146 may include fields for entering such information, and upon receiving a user input from the user of end user computing device 150, such information may be communicated to marketplace server 110. The seller-specific product information may then be stored in at least one of user information database 120 and product information database 122. The seller-specific product information may include, for example, a sale price selected by the seller, a condition of the product (e.g., new, excellent, good), comments concerning the product to be sold, etc.

In operation 308, marketplace server 110 determines whether the user of end user computing device 150 (e.g., the seller) is logged in. Such a process is similar to that described with reference to operation 208.

In the event the user of end user computing device 150 is logged in to marketplace server 110, processing proceeds to operation 310. Operation 310 is similar to operation 210, but in this case marketplace server 110 determines whether one-click listing (i.e., listing a product for sale via a single click action) is enabled for the user.

If one-click listing is not enabled for the user, processing proceeds to operation 312, in which a seller checkout process is performed. The seller checkout process is further described with reference to FIG. 3C. If, on the other hand, one-click listing is enabled, processing proceeds to operation 314, in which a one-click listing processing is performed. One-click listing processing is further described with reference to FIG. 3D. As with one-click purchasing, in some embodiments, one-click listing is always enabled.

In the event the user of end user computing device 150 is not logged in to marketplace server 110, processing proceeds to operation 316. Operation 316 is similar to previously discussed operation 216. If marketplace server 110 does not receive a login request, processing may continue with operation 318. In operation 318, a seller checkout process is performed. The seller checkout process is further discussed with reference to FIG. 3C. If marketplace server 110 does receive a login request, processing may continue with operation 320. In operation 320, marketplace server 110 determines whether the user in an existing user, similar to operation 220. If marketplace server 110 determines that the user is an existing user, processing may continue with operation 322. If marketplace server 110 determines that user is not an existing user, processing may continue with operation 318.

In operation 322, marketplace server 110 performs an existing user login process, similar to operation 222.

Figure 3B:
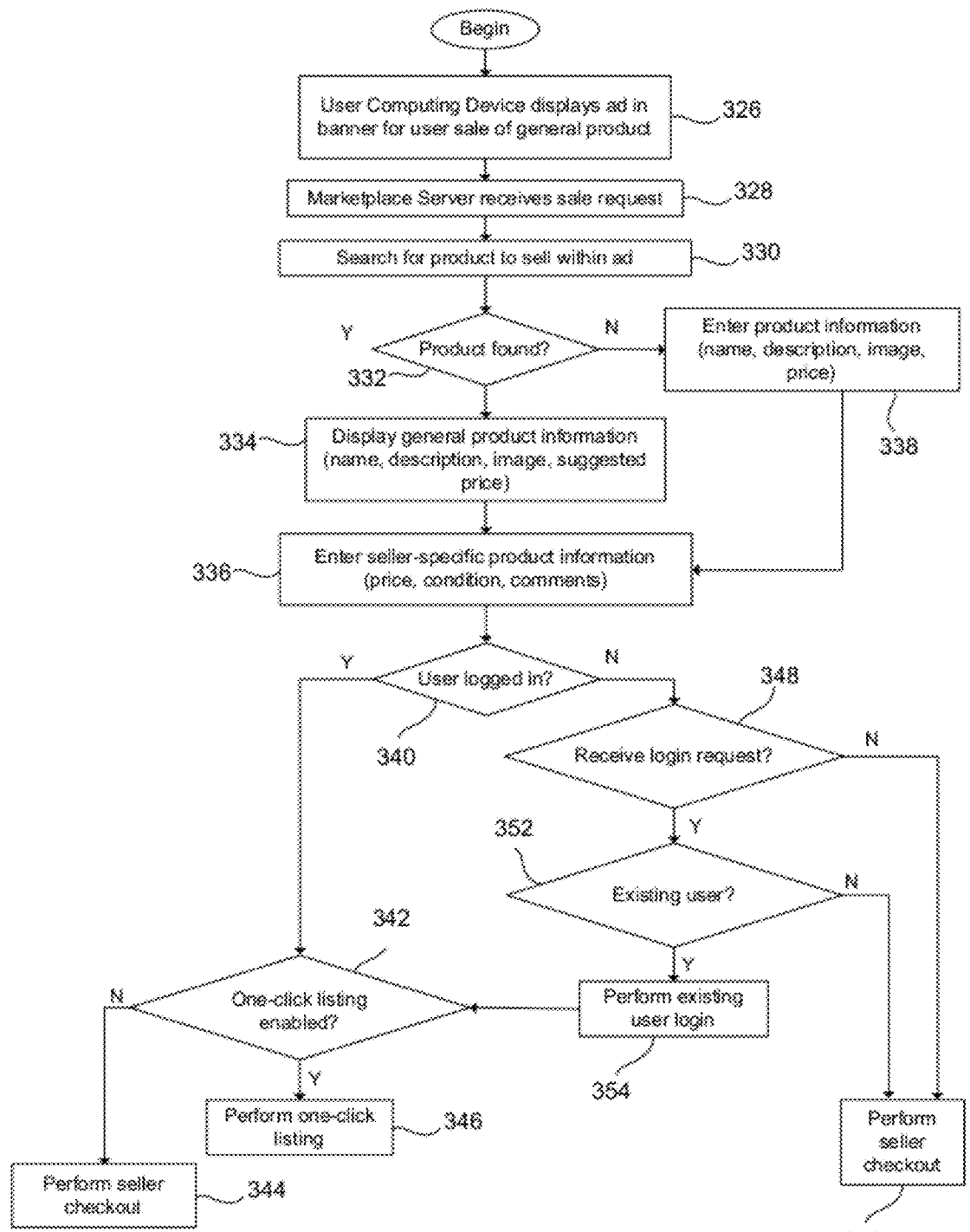
FIG. 3B is a flowchart illustrating a method for enabling a user to search for a product to sell via a web banner.

FIG. 3B is a flowchart illustrating a method for enabling a user to search for a product to sell via a web banner. In operation 326, end user computing device 150 displays an advertisement in a web banner 146 for a user of end user computing device 150. The advertisement may include a general solicitation for the user to sell a good. Web banner 146 may also include a field for allowing the user to enter in a product identifier, such as a name of a product which the user wishes to sell.

In operation 328, marketplace server 110 receives a product sale request. The user of end user computing device 150 (i.e., the seller) may cause the product sale request to be communicated by activating, for example, a button labeled "Search Now" in web banner 146. Upon activating such a button, the information included within the field, such as the product identification information, may be communicated to marketplace server 110. In some embodiments, searching may also or alternatively be performed using live search, instant search, or other search techniques known in the art.

In operation 330, marketplace server 110 begins processing the sale request. Marketplace server 110 beings by searching for a record associated with the product identified by the seller. For example, marketplace server 110 may search product information database 122 for a match with the product identifier submitted by the seller.

If a record associated with the product identified by the seller is found, the process continues to operation 334. In operation 334, marketplace server 110 causes general product information associated with the identified product to be displayed to the seller via web banner 146. General product information may include, for example, a name of the product, a description of the product, an image associated with the product, and a suggested sale price of the product.

In operation 336, marketplace server 110 allows the seller to enter seller-specific product information, similar to operation 306.

If a record associated with the product identified by the seller is not found, the process continues to operation 338. In operation 338, marketplace server 110 allows the seller to enter general product information, similar to operation 306, but in this case allowing the seller to enter general product information rather than seller-specific product information.

Operations 340 to 354 illustrate processing similar to operations 308 to 322.

Figure 3C:
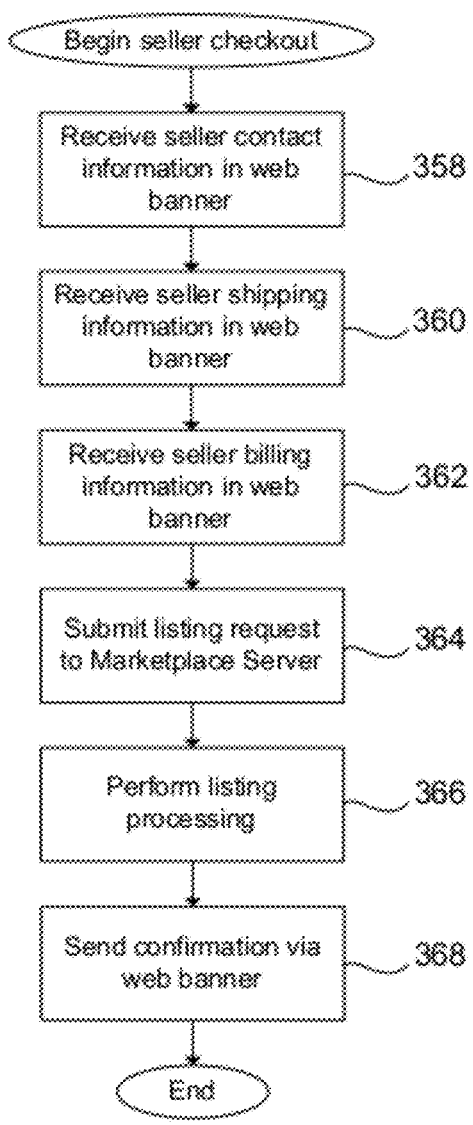
FIG. 3C is a flowchart illustrating a method for performing a seller checkout process for enabling a user to sell a product via a web banner.

FIG. 3C is a flowchart illustrating a method for performing a seller checkout process for enabling a user to sell a product via a web banner. Operations 358 to 368 are similar to operations 226 to 236, with the following exceptions. Operations 358 to 362 are directed to receiving seller, rather than buyer, information. In operation 364, a listing request rather than a purchase order is submitted to marketplace server 110. The listing request may include the seller contact, shipping, and billing information. In some embodiments, the listing request may further include at least one of general product information and seller-specific product information. And in operation 366, a listing processing is performed, where such processing is further described with reference to FIG. 3E.

Figure 3D:
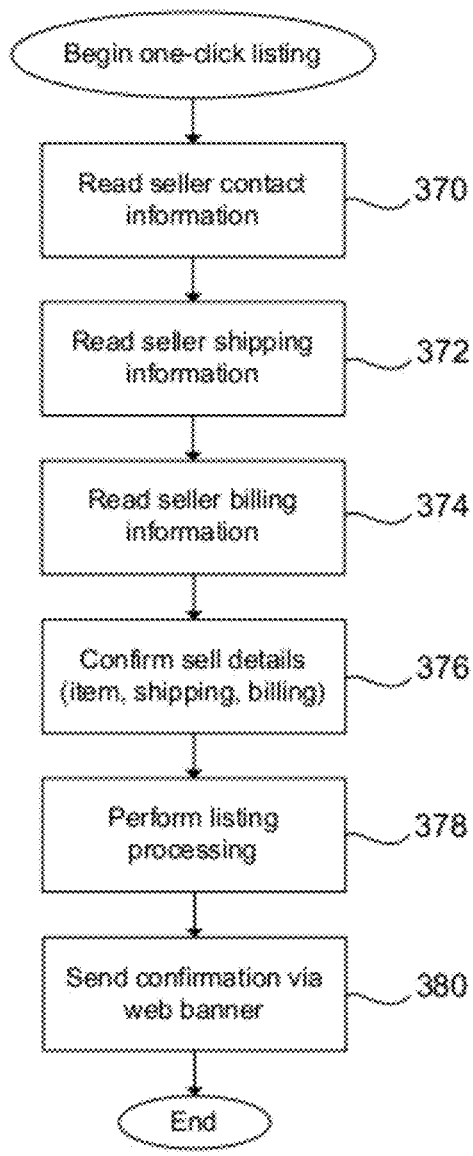
FIG. 3D is a flowchart illustrating a method for performing a one-click listing process for enabling a user to sell a product via a web banner.

FIG. 3D is a flowchart illustrating a method for performing a one-click listing process for enabling a user to sell a product via a web banner. According to a one-click listing process in one embodiment, various processing may be performed in response to receiving a single user input such as activating a banner ad to submit a product sale request. The processing may include, for example, marketplace server 110 receiving the sale request as previously discussed with reference to operation 304, marketplace server 110 performing some or all of the processes subsequently discussed with reference to FIG. 3D, and marketplace server 110 performing some or all of the processes subsequently discussed with reference to FIG. 3E.

With respect to the processes illustrated in FIG. 3D, operations 370 to 380 are similar to operations 238 to 248, with the following exceptions. Operations 370 to 374 are directed to reading seller, rather than buyer, information. In operation 376, sell details are confirmed rather than purchase details. In operation 378, a listing processing is performed, where such processing is further described with reference to FIG. 3E.

Figure 3E:
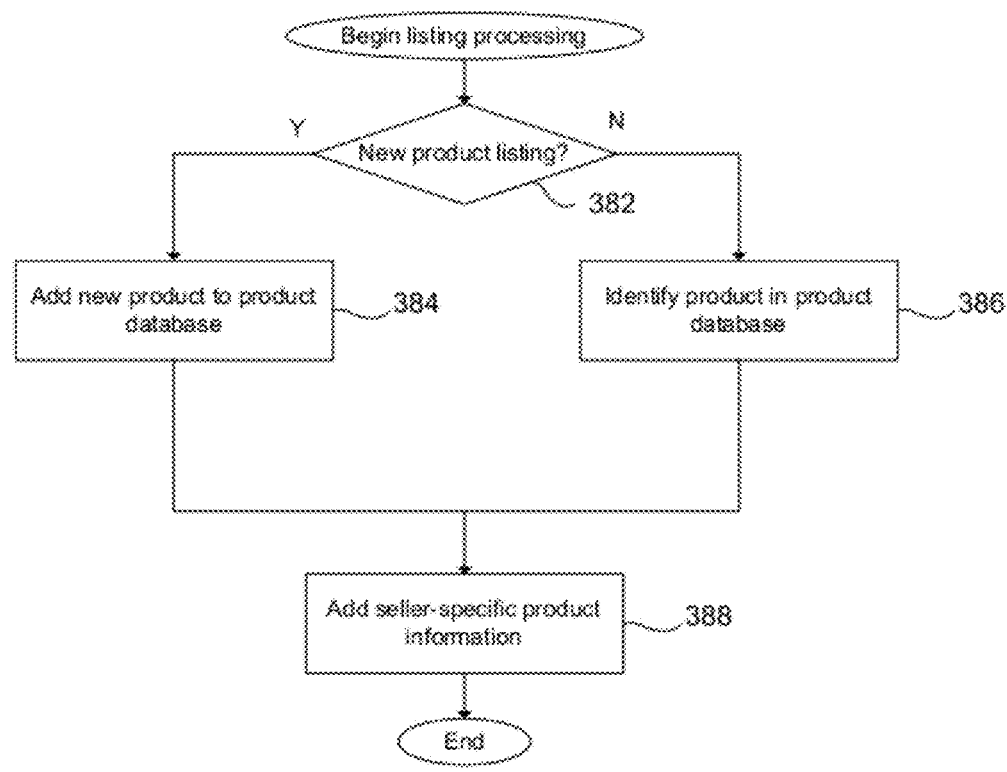
FIG. 3E is a flowchart illustrating a method for performing a listing processing for enabling a user to sell a product via a web banner.

FIG. 3E is a flowchart illustrating a method for performing a listing processing for enabling a user to sell a product via a web banner. In operation 328, marketplace server 110 determines whether the listing request includes a new product or not. For example, marketplace server 110 may compare the product information included within the listing request with product information in the product information database 122. If there is a product match, then marketplace server 110 determines that the request is not for a new product listing. On the other hand, if there is not a product match, then marketplace server 110 determines that the request is for a new product listing.

If the request is for a new product listing, processing may continue with operation 384. In operation 384, marketplace server 110 adds a new product to product information database 122. For example, marketplace server 110 may add a new record to product information database 122, where the new record includes the general product information. The general product information may be included in the listing request or provided in operation 338.

On the other hand, if the request is not for a new product listing, processing may continue with operation 386. In operation 386, marketplace server 110 identifies the product in the product information database 122. For example, marketplace server 110 may identify a record storing information concerning the product identified in the listing request.

In operation 388, marketplace server 110 adds seller-specific product information to a record associated with the product. For example, marketplace server 110 may add seller-specific product information provided in the listing request or provided in operation 336. Such information may be added to the record associated with the product, or such information may be added to user information database 120 with a link to the record holding general information included in product information database 122.

Example Web Banners for Selling Products to End Users

FIGS. 4A to 4D illustrate the use of a web banner for product purchases according to an embodiment of the present invention. The web banner and webpage may correspond to webpage 144 and web banner 146 previously discussed, and may incorporate some or all of the functionality and processes previously described. However, the illustrated arrangement of information, sequence of information portrayal and gathering, and types of information are merely examples, and the scope of the present invention should not be so limited.

Figure 4A:
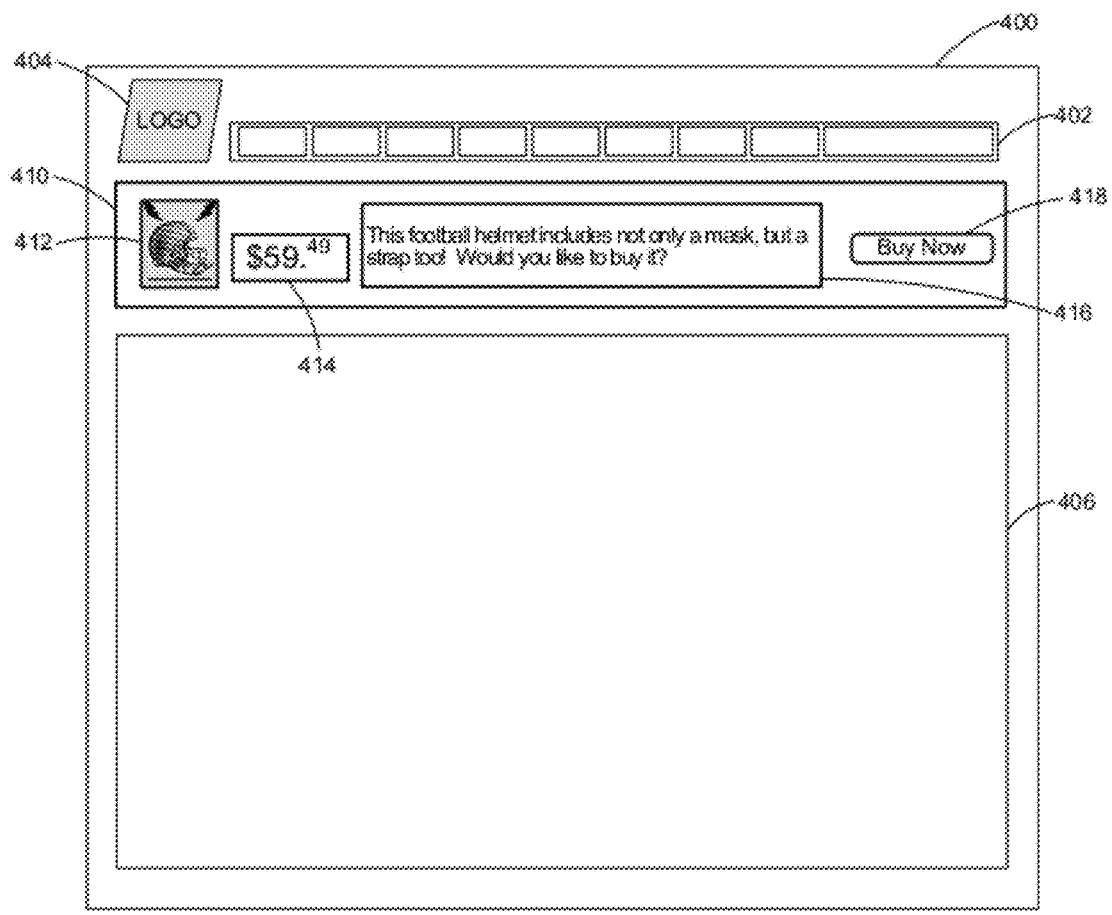
FIG. 4A illustrates, via a web banner and as part of a process for enabling an end user to purchase a product, a product advertisement.

FIG. 4A illustrates, via a web banner and as part of a process for enabling an end user to purchase a product, a product advertisement. Web page 400 may be displayed on end user computing device 150, and may include a menu frame 402 for displaying selectable menu options, a logo image 404 including a picture associated with the web page 400, web page content 406 including content for display on end user computing device 150, and a web banner 410. Web banner 410 may, for example, be displayed by end user computing device 150 in accordance with operation 202.

Web banner 410 may include various information for advertising a specific product which the end user may purchase. For example, web banner 410 may include a product image 412, a product sale price 414, and a product description 416. Product image 412 may be an image associated with the product, the product sale price 414 may be a price of the product, and product description 416 may be a textual description describing the product. Web banner 410 may further incorporate a technique for sending a purchase request. For example, web banner 410 may include a button such as a "Buy Now" button 418 that, when activated by the user, causes end user computing device 150 or webserver 140 to send a product purchase request to marketplace server 110. The product purchase request may include, for example, a product identifier that identifies the product being advertised for purchase by the user.

According to one embodiment, web banner 410 may further display an executable element such as a "Login" button that, when activated by the user, causes marketplace server 110 to perform either an existing user login process or a new user login process.

Figure 4B:
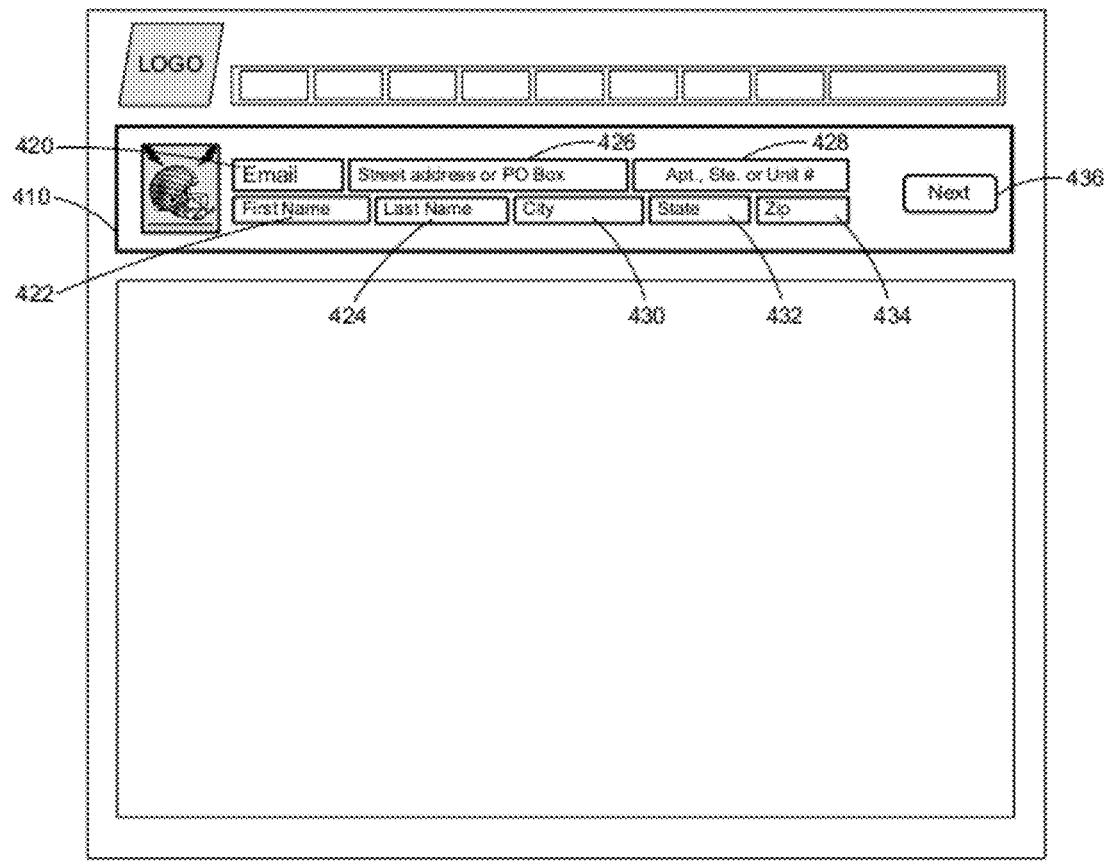
FIG. 4B illustrates, via a web banner and as part of a process for enabling an end user to purchase a product, a first portion of a buyer checkout process.

FIG. 4B illustrates, via a web banner and as part of a process for enabling an end user to purchase a product, a first portion of a buyer checkout process. The buyer checkout process may begin in response to marketplace server 110 receiving the product purchase request. The first portion of a buyer checkout process includes, within the same web banner 410 used for displaying product information, information for soliciting the user for contact and shipping information. With respect to the process discussed with reference to FIGS. 2A to 2E, the first portion of the buyer checkout process may be performed in the case marketplace server 110 did not receive a login request.

The buyer checkout process may include marketplace server 110 causing further information to be displayed on web banner 146 to solicit further information from the user via web banner 146. For example, upon submitting a product purchase request, marketplace server 110 may display fields for enabling the user to enter an email address 420, a first name 422, a last name 424, a street address 426, an apartment number 428, a city 430, a state 432, and a zip code 434. The buyer may fill such fields with the appropriate information via end user computing device 150. Web banner 146 may also include an activation mechanism such as a "Next" button 436. Activation of button 436 by end user computing device 150 may cause the information in the fields to be communicated to marketplace server 110. Marketplace server 110 may then store such information in user information database 120.

Figure 4C:
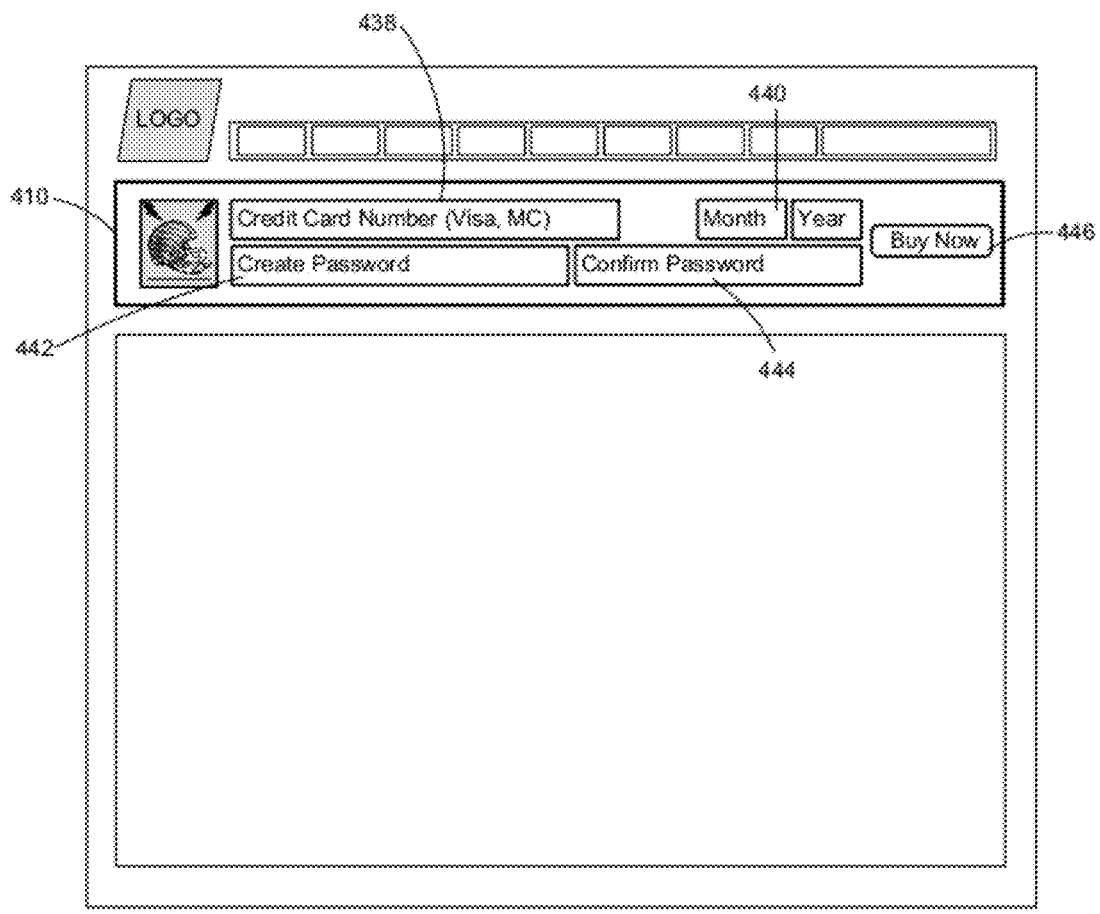
FIG. 4C illustrates, via a web banner and as part of a process for enabling an end user to purchase a product, a second portion of a buyer checkout process.

FIG. 4C illustrates, via a web banner and as part of a process for enabling an end user to purchase a product, a second portion of a buyer checkout process. The buyer checkout process may continue in a similar fashion as discussed with reference to FIG. 4B, where in this case marketplace server 110 solicits billing information in response to activation of button 436. For example, marketplace server 110 may display fields for enabling the user to enter a credit card number 438, a credit card expiry date 440, a password 442, and a password confirmation 444. Activation of a "Buy Now" button 446 may cause the information in the fields to be communicated to marketplace server 110.

According to one embodiment, activation of button 436 does not cause information in fields 420 to 434 to be communicated to marketplace server 110. Rather, such information may be temporarily stored on end user computing device 150. Upon activation of button 446, all information entered into fields by the user may then be communicated to marketplace server 110.

According to another embodiment, activation of button 436 causes end user computing device 150 or webserver 140 to communicate a purchase order to marketplace server 110. The purchase order may include a product identifier and some or all of the information entered by the user. In response to receiving the purchase order, marketplace server 110 may perform a purchase transaction as discussed with reference to FIG. 2D.

Figure 4D:
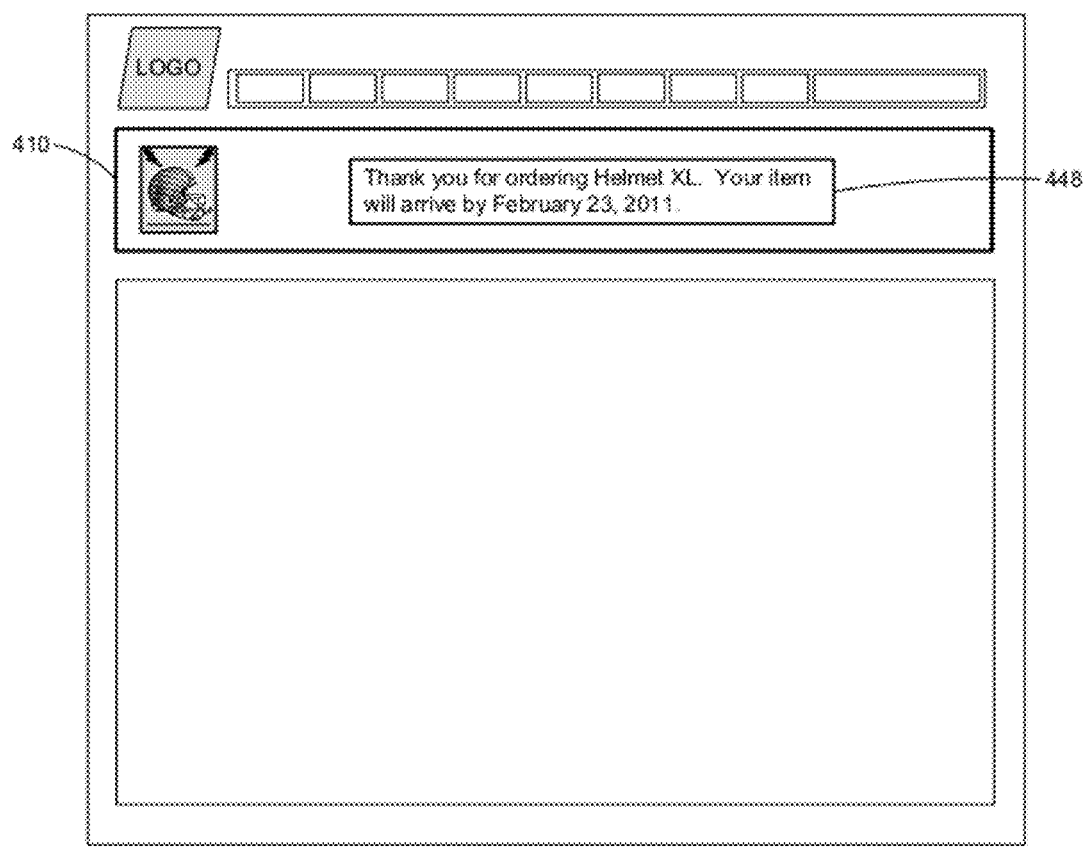
FIG. 4D illustrates, via a web banner and as part of a process for enabling an end user to purchase a product, a third portion of a buyer checkout process.

FIG. 4D illustrates, via a web banner and as part of a process for enabling an end user to purchase a product, a third portion of a buyer checkout process. The third portion includes marketplace server 110 communicating a confirmation of the purchase to the user via web banner 146. The confirmation may include a confirmation information 448 that indicate whether or not the purchase was successful.

As mentioned, the illustrated arrangement of information, sequence of information portrayal and gathering, and types of information are merely examples, and the scope of the present invention should not be so limited.

For example, as illustrated, all of the information displayed to the buyer, including fields for soliciting information from the buyer, may be presented in a single web banner having a fixed size. In such a case, the entire purchase transaction may advantageously be performed in a discrete location of a third party web page. However, in some cases, a size of the web banner may be variable. For example, upon activating button 436, a size of the web banner may be enlarged to then display fields 438 to 446. In such a case, the entire purchase transaction may advantageously be performed without requiring the user to switch between numerous banner screen displays.

For another example, many of the web banner screens may be avoided in the event the end user is logged in to the marketplace server and one-click purchasing is enabled. In such a case, the web banner discussed with reference to FIG. 4A may initially be pushed to the end user computing device 150. Upon activation of button 416, a one-click purchase process may be performed as discussed with reference to FIG. 2C. While marketplace server 110 performs various processing such as that discussed with reference to operations 238 to 246, the next information displayed to the user via web banner may be a confirmation of purchase as discussed with reference to operations 248. In such a case, a purchase transaction may advantageously be streamlined by requiring less input from the buyer.

For yet another example, a buyer may perform a login process at any time during the purchase transaction. For example, a "Login" button may be provided on the product advertisement screen (e.g., the web banner displayed in FIG. 4A), thereby allowing the user to login prior to engaging in the purchase transaction. For another example, a "Login" button may be provided on a different screen, such as the web banner screen soliciting contact and shipping information (e.g., the web banner displayed in FIG. 4B). In such a case, performing a login process may cause the fields to be automatically populated. That is, marketplace server 110 may read the user information from user information database 120, and subsequently communicate such information to end user computing device 150.

Example Web Banners for Soliciting Product Sales from End Users

FIGS. 5A to 5D illustrate the use of a web banner for product sales according to an embodiment of the present invention. The web banner and webpage may correspond to webpage 144 and web banner 146 previously discussed, and may incorporate some or all of the functionality and processes previously described. However, the illustrated arrangement of information, sequence of information portrayal and gathering, and types of information are merely examples, and the scope of the present invention should not be so limited.

Figure 5A:
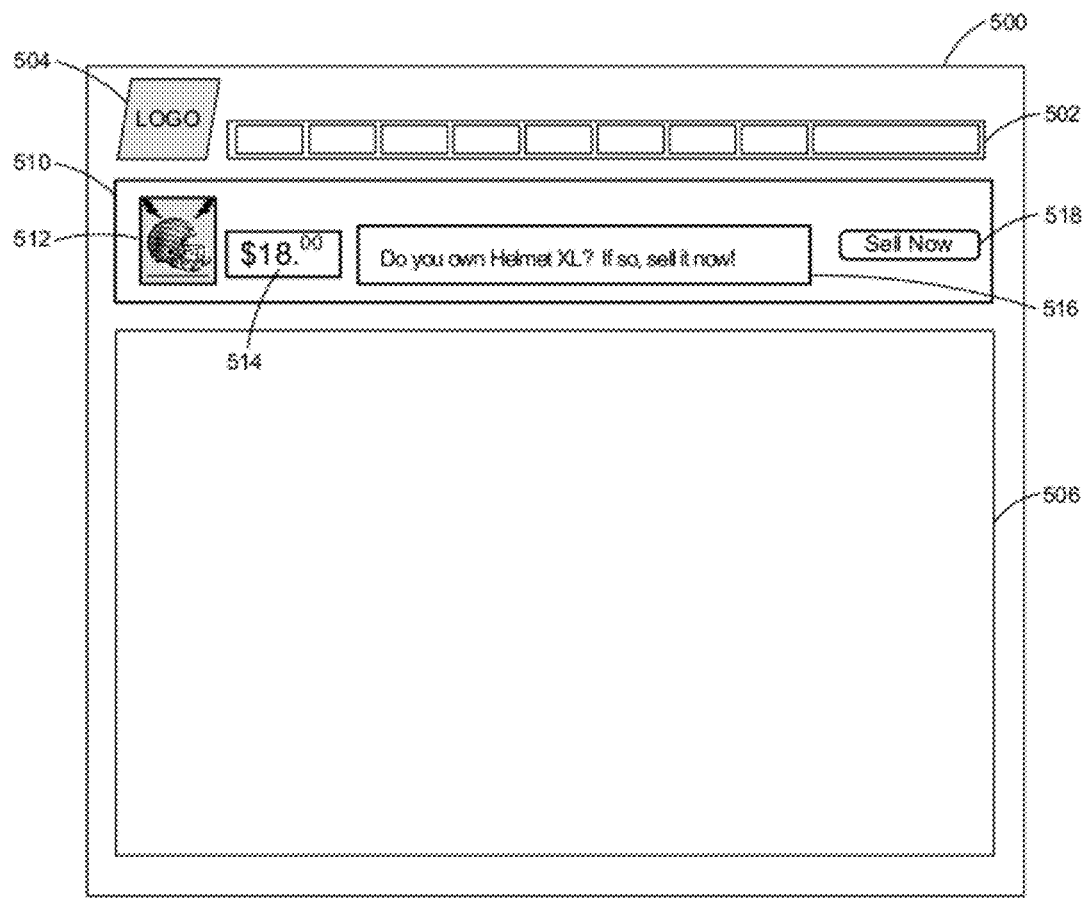
FIG. 5A illustrates, via a web banner and as part of a process for enabling an end user to sell a specific product, a solicitation to sell a specific product.

FIG. 5A illustrates, via a web banner and as part of a process for enabling an end user to sell a specific product, a solicitation to sell a specific product. Web page 500 may be displayed on end user computing device 150, and may include a menu frame 502 for displaying selectable menu options, a logo image 504 including a picture associated with the web page 500, web page content 506 including content for display on end user computing device 150, and a web banner 510. Web banner 510 may, for example, be displayed by end user computing device 150 in accordance with operation 302.

Web banner 510 may include various information for advertising a specific product which the end user may sell. For example, web banner 510 may include a product image 512, a suggested product sale price 514, and a product description 516. Product image 512 may be an image associated with the product, the product sale price 514 may be a price of the product, and product description 516 may be a textual description describing the product. Web banner 510 may further incorporate a technique for sending a sale request. For example, web banner 510 may include a button such as a "Sell Now" button 518 that, when activated by the user, causes end user computing device 150 or webserver 140 to send a product sale request to marketplace server 110. The product sale request may include, for example, a product identifier that identifies the product being advertised for sale by the user.

According to one embodiment, web banner 510 may further display a "Login" button that, when activated by the user, causes marketplace server 110 to perform either an existing user login process or a new user login process.

Figure 5B:
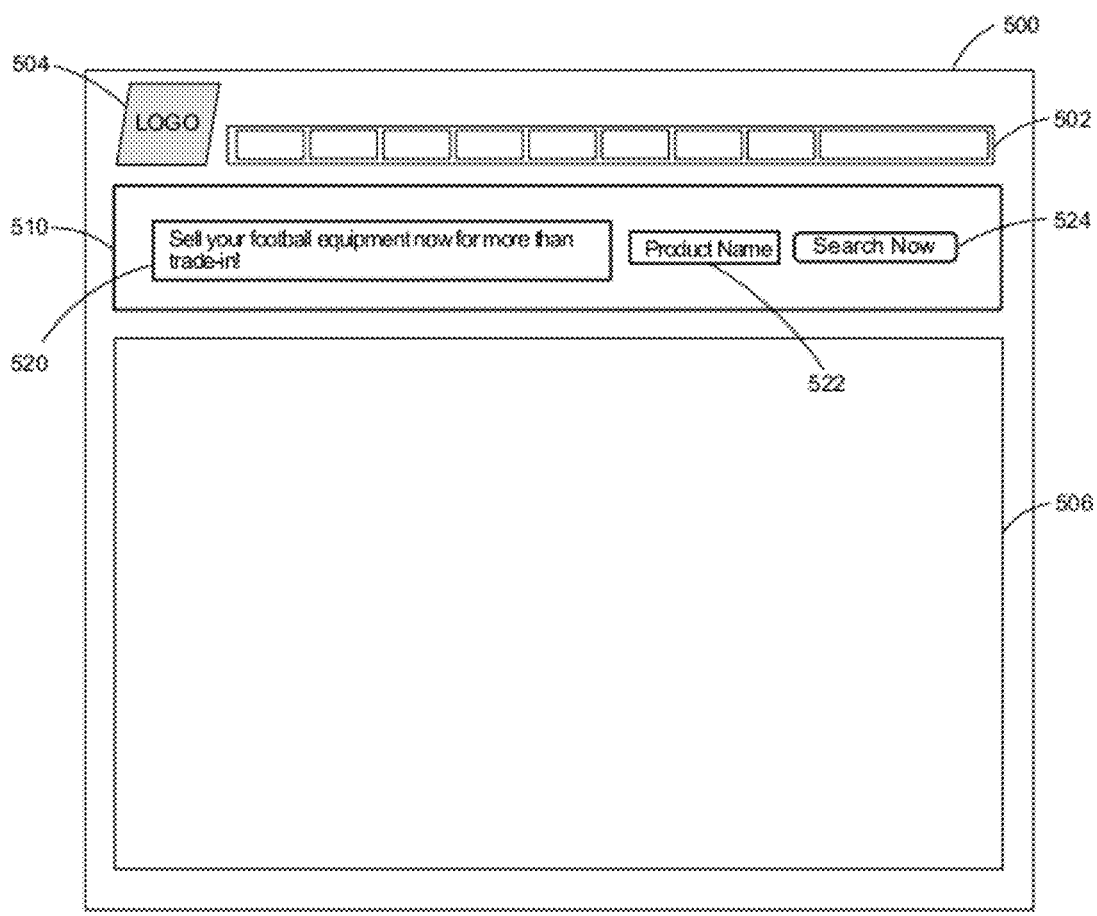
FIG. 5B illustrates, via a web banner and as part of a process for enabling an end user to sell a general product, a solicitation to search for products to sell.

FIG. 5B illustrates, via a web banner and as part of a process for enabling an end user to sell a general product, a solicitation to search for products to sell. Web page 500 may be displayed on end user computing device 150, and may include a menu frame 502 for displaying selectable menu options, a logo image 504 including a picture associated with the web page 500, web page content 506 including content for display on end user computing device 150, and a web banner 510. Web banner 510 may, for example, be displayed by end user computing device 150 in accordance with operation 326.

Web banner 510 may include various information for soliciting the end user to sell a product. For example, web banner 510 may include a solicitation message 520, a product search field 522, and a "Search Now" button 524. Solicitation message 520 may inform the user that the user may search for products to sell. For example, solicitation message 520 may say "Sell your games now for more than trade-in!" Product search field 522 may be a field for receiving input from end user computing device 150, such as a name or other identifier of a product which the user wishes to sell. Activation of button 524 may cause end user computing device 150 or webserver 140 to send a product sale request to marketplace server 110. The product sale request may include, for example, the information in field 522, and an indicator indicating a request to search for the product in product information database 122.

Figure 5C:
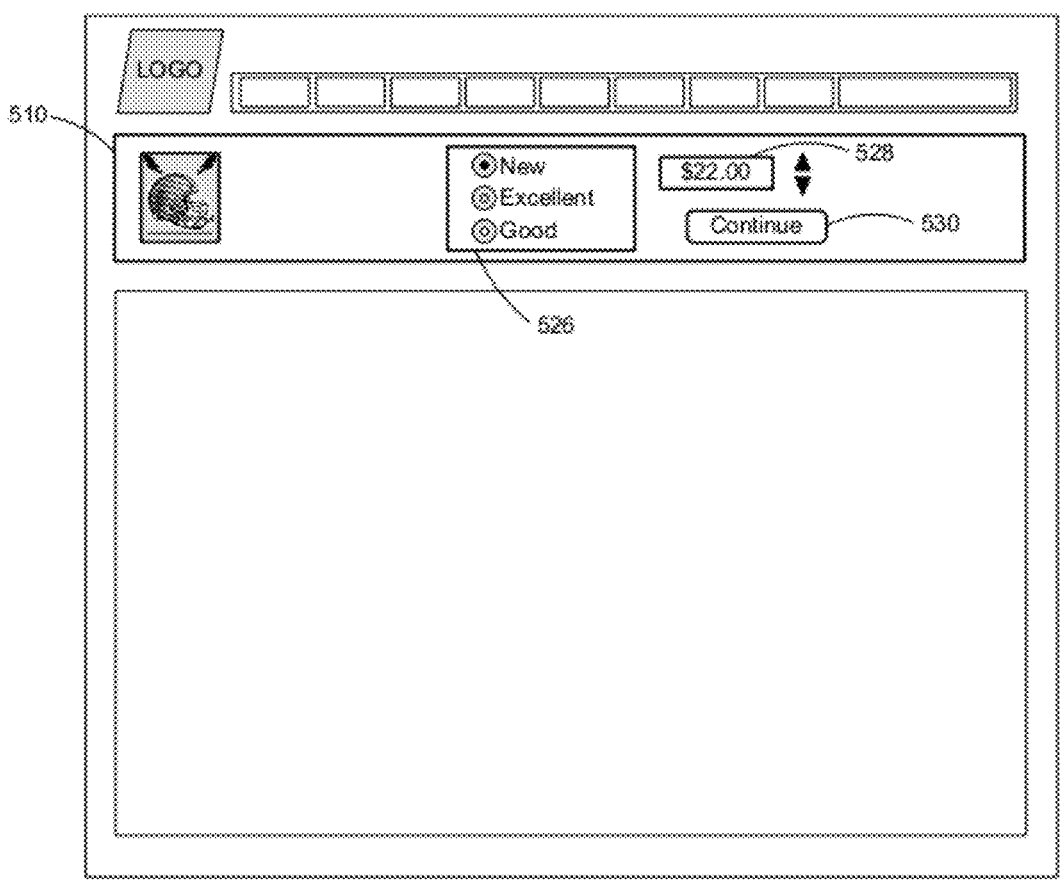
FIG. 5C illustrates, via a web banner and as part of a process for enabling an end user to sell a product, a solicitation for specific product information.

FIG. 5C illustrates, via a web banner and as part of a process for enabling an end user to sell a product, a solicitation for specific product information. The solicitation for specific product information may correspond, for example, to operation 306 or operation 336.

According to one embodiment, after displaying an ad in web banner 146 as discussed with respect to FIG. 5A and after receiving a sale request, marketplace server 110 may solicit the user for seller-specific product information. This solicitation may correspond to operation 306. According to another embodiment, after displaying an ad in web banner 146 as discussed with respect to FIG. 5B, and after acquiring and/or displaying general product information, marketplace server 110 may solicit the user for seller-specific product information. This solicitation may correspond to operation 336.

Soliciting the user for seller-specific product information may include displaying in web banner 146 user-selectable options 526 for a condition of the product which the user wishes to sell. For example, radio buttons may be provided for enabling the user to indicate whether the product is new, is in excellent condition, or is in good condition. A field for a sale price 528 may also be displayed, and may be pre-populated with the suggested sale price. Activation of a button such as a "Continue" button 530 may cause the seller-specific product information to be communicated to marketplace server 110.

Figure 5D:
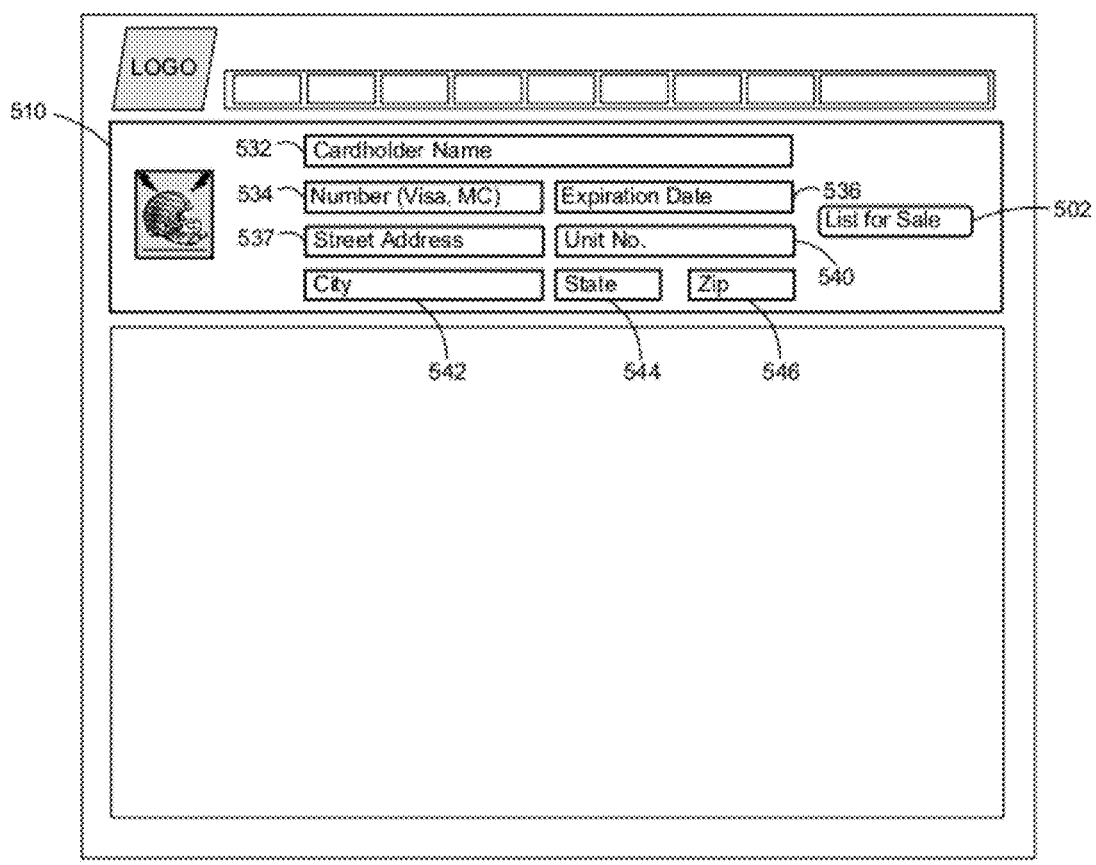
FIG. 5D illustrates, via a web banner and as part of a process for enabling an end user to sell a product, a portion of a seller checkout process.

FIG. 5D illustrates, via a web banner and as part of a process for enabling an end user to sell a product, a portion of a seller checkout process. The seller checkout process is similar to the previously described buyer checkout process. According to this embodiment, however, all of the seller information is received in the same instance of web banner 146.

For example, web banner 510 may include fields for enabling the user to enter a cardholder name 532, a credit card number 534, a credit card expiry date 536, a street address 538, an apartment number 540, a city 542, a state 544, and a zip code 546. The seller may fill such fields with the appropriate information via end user computing device 150. Web banner 146 may also include an activation mechanism such as a "List for Sale" button 548, activation of which may cause information in the fields to be communicated to marketplace server 110. Marketplace server 110 may then store such information in user information database 120.

The web banners discussed herein may be implemented using any one of a variety of techniques. For example, the web banners may be implemented as a JavaScript program or a multimedia object employing technologies such as Java, Shockwave or Flash. In some embodiments, the web banners may be implemented as a hypertext markup language (HTML) inline frame (iFrame).

The web banners may have any one of a number of fixed sizes. For example, the web banners may be a 728 pixel×90 pixel leaderboard banner; a 486 pixel×60 pixel full banner; a 120 pixel×240 pixel vertical banner; a 250 pixel×250 pixel square pop-up banner; etc. The web banners may have a variable size. For example, the web banner may have an initial size of 728 pixels×90 pixels, and in response to user input change to a subsequent size of 728 pixels×180 pixels.

According to one embodiment, control of the information displayed by a web banner may be transferred between devices. For example, an advertising network may initially display advertising information in the web banner. In response to user activation of the web banner or an element of the web banner, control may be handed off to marketplace server 110. Marketplace server 110 may then operate to cause information to be displayed and returned via the web banner as discussed herein.

As mentioned, the illustrated arrangement of information, sequence of information portrayal and gathering, and types of information are merely examples, and the scope of the present invention should not be so limited. For example, all of the variations discussed with reference to FIGS. 4A to 4D are equally applicable to the embodiments discussed with reference to FIGS. 5A to 5D. This includes variations such as the web banner having a fixed or variable size, avoiding screens in the event the user is logged in, and various times to perform a login process.

Figure 6A:
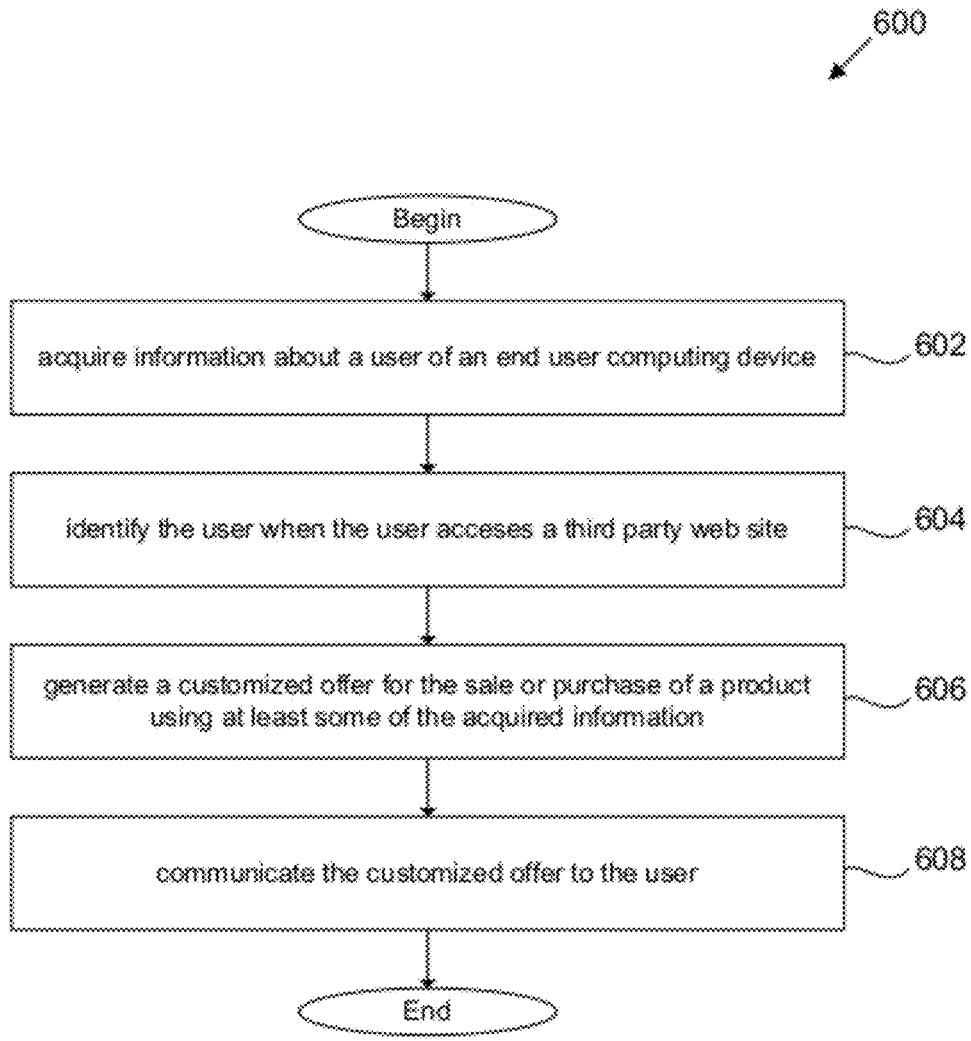
FIG. 6A is a flowchart illustrating a method for providing a customized offer to a user according to a first embodiment.

Processes for Providing Customized Offers to End Users Via Commerce-Enabled Banner Ads FIG. 6A is a flowchart illustrating a method 600 for providing a customized offer to a user according to a first embodiment. The user may, for example, be a user of end user computing device 150.

In operation 602, marketplace server 110 acquires information about a user of end user computing device 150. Numerous types of information may be acquired using one or more a variety of types of information gathering mechanisms. For example, various types of information may be gathered based on the user's interaction with a web page hosted by marketplace server 110. Such information may include an IP address of the user, a clickstream of the user (i.e., an indication of web pages visited, product pages viewed, adds to shopping carts, content consumed such as product reviews, web applications executed, and the like), a propensity to respond to offers, purchase and sale-related information, location information (e.g., a zip code or address of the user), a gender of the user, etc.

For another example, various types of information may be gathered by placing a cookie on the end user computing device. In one embodiment, when the user visits a web site hosted by marketplace server 110, marketplace server 110 may store a cookie for the user on the end user computing device. The cookie may then subsequently record clickstreams for the user when the user visits websites hosted by servers other than marketplace server 110, such as a third party web site that has a relationship with marketplace server 110 to report such information. The servers other than marketplace server 110 may then communicate the clickstream information to marketplace server 110. The cookie may also record information indicating web pages visited, product interest (product pages viewed, adds to shopping carts, content consumed such as a product review), etc. In another embodiment, the cookie may be stored on the end user computing device when the user visits a third party web site. It should be recognized that embodiments of the invention are not limited only to cookie technology, but rather some embodiments include other technologies that track a user's interaction with web sites or the like.

For yet another example, various types of information may be communicated to marketplace server 110 by a third party computing device. For example, the third party computing device may accumulate such information, and then communicate the information to marketplace server 110. Such information may be communicated based on a purchase agreement or the like. The information may be provided in the form of a cookie.

Accordingly, marketplace server 110 may acquire various types of information about a user of an end user computing device. The information may include demographic information concerning the user. The demographic information may be any type of demographic information. For example, demographic information might include age, employment status, abilities or disabilities, education level, income, marital status, gender, race, etc. The demographic information may be associated with a particular user by, for example, associating it with a user identifier. Both the user identifier and the corresponding demographic information may be stored in, for example, user information database 120 of marketplace server 110.

The information may also or alternatively include behavior information concerning the user. Behavior information may include any type of behaviors related to the user. For example, it may include the number of times a particular product advertisement and/or offer has been shown to the user, the propensity of the user to click on offers, the types of websites the user has a tendency to visit, the frequency which the user purchases or sells products, etc. Again, marketplace server 110 may store such information in user information database 120.

The information may also or alternatively include product interests of the user. Product interest information may include any type of information suggesting the user's desire to purchase or sell a particular product. For example, it may include product pages viewed by the user, adds to shopping carts, content consumed such as product reviews, etc. Once again, marketplace server 110 may store such information in user information database 120.

In operation 604, marketplace server 110 identifies the user when the user accesses a third party web site. Identifying the user when the user accesses a third party web site may be performed using any one of various techniques. For example, the third party web site may send an indicator to marketplace server 110 indicating that the user is accessing the third party web site. For another example, another device or entity may send an indicator to marketplace server 110 indicating that the user is accessing the third party web site. For yet another example, during retargeting as known in the art, an ad exchange server may send an indicator to marketplace server 110 indicating that the user is accessing the third party web site. For yet another example, during retargeting as known in the art, an ad exchange server may send an indicator to a retargeting server, and the retargeting server may subsequently submit a request to marketplace server 110 to generate an offer for the user. The request may also include an indicator identifying the user and indicating that the user is accessing a third party web site. In some embodiments, the indicator may be a cookie associated with the user and include information about the user.

In operation 606, marketplace server 110 generates, in response to identifying the user, a customized offer for the sale or purchase of a product using at least some of the acquired information about the user, the customized offer being customized for the user. In one embodiment, the offer is for the sale of a product. In such a case, the offer may include information for soliciting the user to sell or offer for sale a product. For example, the product may be in the possession of the user, or there may be a likelihood that the product is in the possession or control of the user. In another embodiment, the offer is for the purchase of a product. In such a case, the offer may include information for soliciting the user to purchase a product. For example, there may be a likelihood that the user desires or has shown an interest in acquiring the product.

The offer may be any suitable type of offer. In one embodiment, where the offer is for enticing the user to sell a product, the offer may be an offer to provide a certain monetary amount to the user. For example, where the offer is for enticing the user to sell a computer game, the offer may indicate that if the user accepts the offer, a certain amount of money will be transferred to the user which is higher than the typical sales value for that good. In another embodiment, where the offer is for enticing the user to purchase a product, the offer may be an offer to provide a certain monetary discount to the user. For example, where the offer is for enticing the user to purchase a computer game, the offer may indicate that if the user accepts the offer, the user may purchase the computer game for retail price minus a certain percentage or a certain dollar amount. Other types of offers include providing rebates, additional goods or services, free shipping, free trials, etc.

The offer is customized for the user. For example, the offer may be customized for a user of the end user computing device 150. The offer is customized in that the offer is generated for the consumption of only the end user which the offer is provided to. For example, marketplace server 110 may identify the end user as previously described, which may include extracting identifying information from a received cookie. The extracted identifying information may then be compared with information stored in marketplace server 110, such as information stored in user information database 120. If there is a match between the received identifying information and the information stored in user information database 120, marketplace server 110 may generate an offer unique to that identifying information.

Various types of information may be used to customize the offer. In one embodiment, marketplace server 110 uses some or all of received demographic information, behavior information, and product interest information. For example, if marketplace server 110 determines that the user lives in an affluent community, a 10% discount may be offered, whereas if the user lives in a less than affluent community, a 20% discount may be offered. For another example, if marketplace server 110 determines that the user frequently purchases products, a 20% discount may be offered, whereas if the user purchases products infrequently, a 10% discount may be offered. One skilled in the art would recognize various combinations and use of received user information.

According to one embodiment, marketplace server 110 stores product information in product information database 122. The product information may include at least one of: product metadata such as an image associated with a product, a textual description of the product, and the like; product pricing information from a seller, such as a retail price, a breakeven price, and a disposal price; product pricing information from the marketplace, such as a market price; product availability from a seller, such as whether the product is in stock, how many days the product has been in stock, etc; and information identifying related products. Marketplace server 110 may obtain such information from any suitable source. Such product information may be associated with a particular product identifier, both of which may be stored in, for example, product information database 122.

Marketplace server 110 may also use stored product information to generate the customized offer. In one embodiment, marketplace server 110 compares the product interests of the user to product information stored in product information database 122. Based on the comparison, marketplace server 110 identifies a product which the user has expressed an interest in or a product related to the product which the user has expressed an interest in. Marketplace server 110 may then generate the customized offer based on the identified product or related product. That is, the offer may be for a discount if the user purchases the identified or related product or for an increased sale price if the user sells the identified product or related product.

Marketplace server 110 may use the stored product information, either alone or in combination with stored user information, to generate any one of a variety of types of customized offers. For example, marketplace server 110 may use the retail price and the retailer's floor price to generate increasingly lucrative offers. For example, a first offer provided to a user may offer a 10% discount. A subsequent offer, provided after the first offer expires, may offer the user a 20% discount. For another example, marketplace server 110 may use the user information to determine that the user is a high-value buyer (e.g., a repeat buyer), and use the product information to determine that a product has a high margin and has been held in inventory for a long time. Based on such information, marketplace server 110 may generate an offer that provides a significant discount to move the product and to re-engage the valuable user.

In operation 608, marketplace server 110 communicates the customized offer to the user. The offer may be communicated using any one of a variety of techniques. For example, the customized offer may be communicated using any one or more of computer network-based communication technologies, such as web text ads, online video ads, mobile text messages or other mobile alerts, etc. In one embodiment, the offer is provided for display in a web banner on the end user computing device 150.

The offer may be provided for display in web banner 146 in one or more of a variety of ways. For example, the offer may be provided by marketplace server 110 to end user computing device 150 via banner interface module 112. For another example, the offer may be provided to webserver 140 by marketplace server 110 or another entity, after which webserver 140 may cause the offer to be displayed via web banner 146. For yet another example, a third party entity such as an ad server may cause the offer to be displayed via web banner 146.

In one embodiment, web banner 146 is used to advertise information concerning a product. The advertising may be general advertising, targeted advertising, or re-targeted advertising, as known in the art. An offer may be displayed subsequent to or simultaneous with the product advertising, and may be displayed in the same or a different web banner as the advertising.

In some embodiments, the offer is only valid for a predetermined time. For example, the predetermined time may be a certain amount of time, such as one minute, five minutes, ten minutes, or the like. For another example, the predetermined time may be only while web banner 146 displays the offer. For yet another example, the predetermined time may be only while the web banner 146 is displayed on webpage 144. For yet another example, the predetermined time may be only until the user indicates a refusal of the offer, such as by activating a "No thanks" button on web banner 146.

In some embodiments, the offer must be executed within web banner 146. That is, to accept the offer, the user must activate the web banner 146 by, for example, activating a "Yes please" button on web banner 146. Once the offer is executed, marketplace server 110 receives an indication of acceptance. Upon receiving such an indication, marketplace server 110 may process the offer. Processing the offer may include performing operations substantially similar to those previously discussed regarding the sale and purchase of products. In this case, however, offer information stored in product information database 122, for example, information indicating the product being offered for purchase or sale and information indicating the price for the purchase or sale, may be used for facilitating the transaction. For example, where the user accepts an offer to purchase a product, processing may begin at operation 206 discussed with respect to FIG. 2A. In such a case, the purchase request will refer to the offer information.

According to one embodiment, once an offer is accepted within web banner 146, the subsequent processing for fulfilling the offer is also performed within web banner 146. As previously discussed with respect to advertisements, a size of the web banner 146 may stay constant or change as the transaction progresses from displaying the offer to confirming the purchase or sale. According to other embodiments, subsequent processing may be performed outside of web banner 146. For example, the subsequent processing may be performed on web page 144, a different web page, or a different web banner.

By combining one or more of these features, a 'flash sale' environment may be created. In such an environment, an offer is specifically customized for a user, distributed widely across the internet, and yet constrained by time (the offer is only valid until the user turns the page) and location (the user must act within the ad).

Figure 6B:
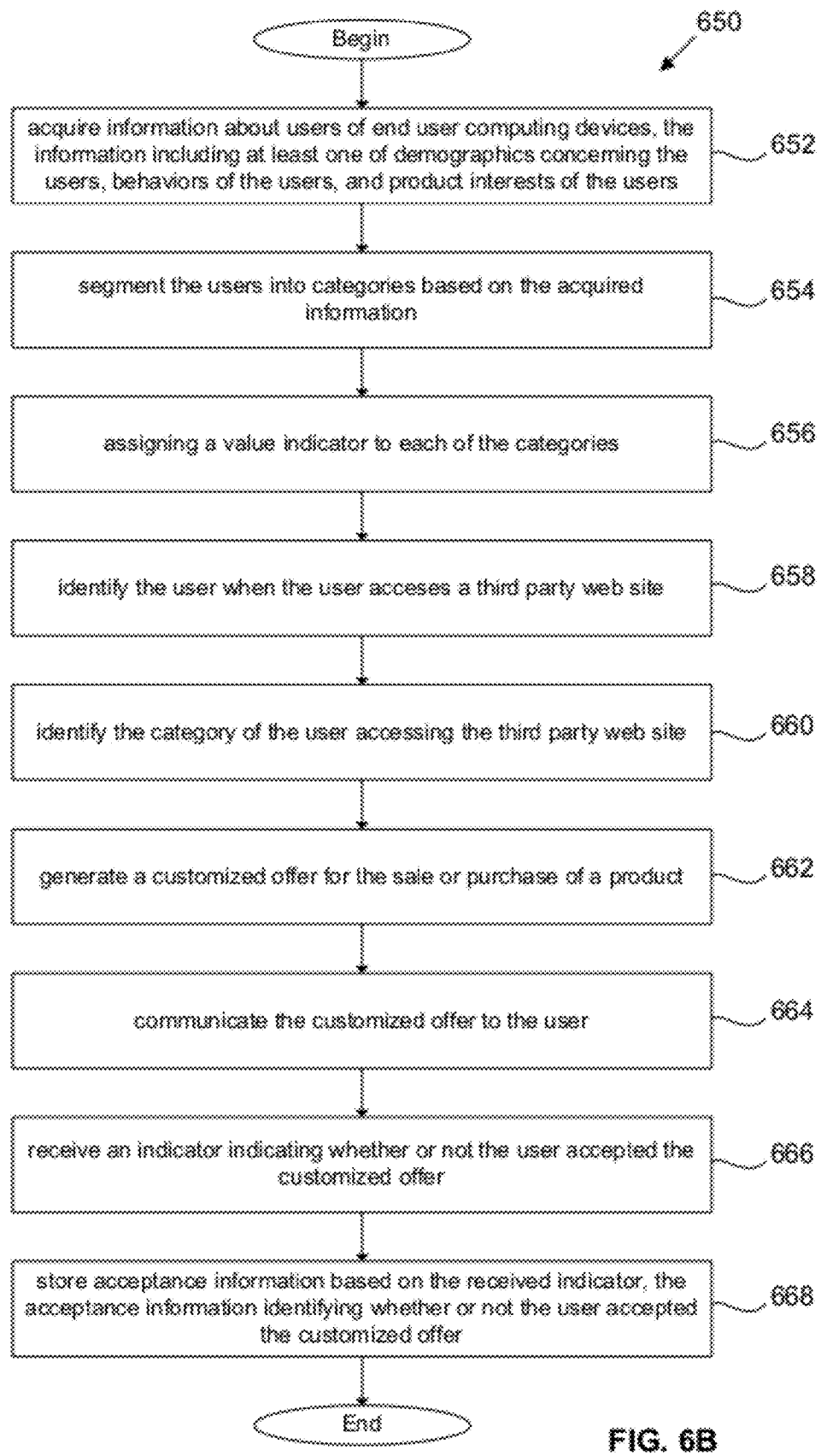
FIG. 6B is a flowchart illustrating a method for providing a customized offer to a user according to a second embodiment.

FIG. 6B is a flowchart illustrating a method 650 for providing a customized offer to a user according to a second embodiment. Operation 652 is substantially similar to operation 602, except in this case information about a plurality of users is acquired. Acquiring such information may equally be performed in the first embodiment discussed with respect to FIG. 6A.

In operation 654, marketplace server 110 segments the plurality of users into categories based on the acquired information. Each category is generated based on similarities of the users. For example, users having a particular zip code may be segmented into a particular category. For another example, users having a certain propensity to respond to offers may be segmented into a particular category. One skilled in the art would recognize the various types of categories that users may be segmented into, and would also recognize that categories may include a number of users or, in one embodiment, only a single user.

In operation 656, marketplace server 110 assigns a value indicator to each of the categories. The value indicator indicates a value associated with each category. For example, a category for users having a high response rate to offers may be assigned an indicator indicating a high value, whereas a category for users having a low response rate to offers may be assigned an indicator indicating a low value.

In operation 658, marketplace server 110 identifies the user when the user accesses a third party web site. This operation is similar to operation 604, and thus further explanation is unnecessary. In this case, however, the user is identified out of the plurality of users.

In operation 660, marketplace server 110 identifies the category of the user accessing the third party web site. For example, marketplace server 110 may store in, e.g., user information database 120, information concerning each user including value indicators associated with each user. Upon receiving information identifying a user accessing a third party web site, marketplace server 110 may search user information database 120 for matching user information and extract the value indicator associated with the identified user.

In operation 662, marketplace server 110 generates a customized offer for the sale or purchase of a product. This operation is similar to operation 606. However, in this case, the generating the customized offer may also take into account the value indicator associated with the user. For example, where the value indicator indicates that the user is a high value user, the offer may be very generous for the user, whereas if the value indicator indicates that the user is a low value user, the offer may be less generous for the user.

In operation 664, marketplace server 110 communicates the customized offer to the user. This operation is similar to operation 608, and thus further explanation is unnecessary.

In operation 666, marketplace server 110 receives an indicator indicating whether or not the user accepted the customized offer. The indicator may be provided, for example, by end user computing device 150. In some embodiments, the indicator may be provided if the user clicks or actives the offer. In other embodiments, the indicator may be provided only if the user completes a transaction that utilizes the offer. In yet other embodiments, the indicator may include information indicating the user activity, such as whether the user activated the offer, and whether the user completed the transaction.

In operation 668, marketplace server 110 stores acceptance information based on the received indicator, the acceptance information identifying whether or not the user accepted the customized offer. For example, the acceptance information may be stored in user information database 120, and be associated with the user. In one embodiment, such additional information may then subsequently be used to further customize offers sent to the user. That is, a subsequent customized offer may be generated based on the acceptance information. The acceptance information may be used to change, for example, products displayed to the user, ad creative, or offer type and value.

The illustrated arrangement of information, sequence of information portrayal and gathering, and types of information discussed with reference to FIGS. 6A and 6B are merely examples, and the scope of the present invention should not be so limited. For example, processing discussed with reference to FIG. 6B is equally applicable to the embodiment discussed with reference to FIG. 6A. For another example, the order of operations is not limited by that illustrated in FIGS. 6A and 6B; rather, other orders are within the scope of the invention. For yet another example, all of the processing steps discussed with reference to FIGS. 6A and 6B are neither essential nor necessary; rather, steps such as segmenting users, assigning values based on user categories, and others are not required.

Implementation of Various Computing Devices

Figure 7:
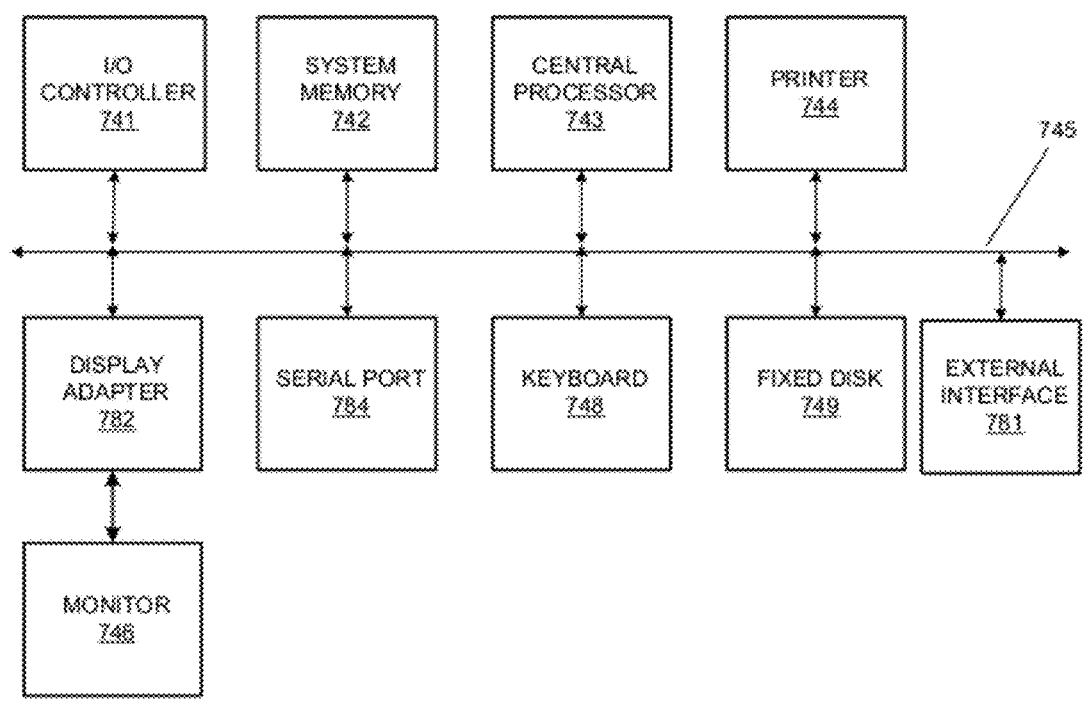
FIG. 7 is a high level block diagram of a computer system that may be used to implement various entities or components described in embodiments of the present invention.

FIG. 7 is a high level block diagram of a computer system that may be used to implement various entities or components described in embodiments of the present invention (e.g., an end user computing device, a webserver, etc.). The computer system may include some or all of the subsystems shown in FIG. 7. The subsystems shown in FIG. 7 are interconnected via a system bus 745. Additional subsystems such as a printer 744, keyboard 748, fixed disk 749, monitor 746, which is coupled to display adapter 782, and others are shown. Peripherals and input/output (I/O) devices, which couple to I/O controller 741, can be connected to the computer system by any number of means known in the art, such as serial port 784. For example, serial port 784 or external interface 781 can be used to connect the computer apparatus to a wide area network such as the Internet, a mouse input device, or a scanner. The interconnection via system bus allows the central processor 743 to communicate with each subsystem and to control the execution of instructions from system memory 742 or the fixed disk 749, as well as the exchange of information between subsystems. The system memory 742 and/or the fixed disk 749 may embody a computer readable medium.

Any of the software components or functions described in this application, may be implemented as software code to be executed by a processor using any suitable computer language such as, for example, Java, Javascript, HTML, C, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

It is to be understood that the examples and embodiments described above are for illustrative purposes only and that various modifications or changes in light thereof will be suggested to persons skilled in the art and are to be included within the spirit and purview of this application and scope of the appended claims. For example, the links ads could be placed in video games, such as an image of a DVD on a shelf in a virtual room being linked to a single page buy when clicked. For another example, the products can be DVDs, CDs, video games, books, consumer electronics (i.e., PDAs, cell phones, etc.), jewelry, toys, software or any other product or service. The product or service can be bought, bartered for or rented. The embodiments can be applied to single or multi-vendor e-commerce systems, and the vendors can be individuals, large corporations, small businesses, charities or any other organization. As used in the claims, the term "products" includes services. Furthermore, the term "products" can also include digital goods, including video files, audio files, and other digital goods. Although described in terms of a computer, embodiments of the invention are applicable in any web environment, including mobile web environments. Therefore, the above description should not be understood as limiting the scope of the invention as defined by the claims.

What is claimed is:

1. An apparatus, comprising:
   a storage element operable to store:
      product information for a plurality of products offered for sale by a plurality of sellers, the product information including, for each product, a product price and a product description;
      buyer information for a plurality of buyers of the products offered for sale, the buyer information including, for each buyer, a buyer identifier identifying the buyer, contact information indicating information for contacting the buyer, and billing information for the buyer; and
      seller information for the sellers, the seller information including, for each seller, a seller identifier identifying the seller, contact information indicating information for contacting the seller, and billing information for the seller; and
   a processor operable to:
      acquire information about a user of an end user computing device;
      determine a likelihood that the user is in possession or control of one of the plurality of products offered for sale by the sellers;
      identify the user from the buyers and the sellers when the user accesses a third party web site hosted by a server;
      in response to identifying the user, generate an offer for a sale or purchase of at least one of the products offered for sale using at least some of the acquired information about the user and the product information stored in the storage element, the offer being customized for the user, wherein generate the offer for a sale or purchase of at least one of the products offered for sale includes generate, based on the likelihood that the user is in possession or control of one or more of the products offered for sale by the sellers, an offer that solicits the user to sell the product that they are in possession or control of; and
      communicate the customized offer to the user.

2. The apparatus of claim 1, wherein being operable to acquire information about a user includes at least one of: being operable to gather information based on the user's interaction with a web site hosted by the apparatus, being operable to receive information from a cookie located on the end user computing device, and being operable to receive information from a cookie provided by a third party computing device.

3. The apparatus of claim 1, wherein information about a user includes at least one of demographics concerning the user, behaviors of the user, and product interests of the user.

4. The apparatus of claim 1, wherein being operable to identify the user includes being operable to receive an indicator indicating that the user is accessing the third party web site.

5. The apparatus of claim 4, wherein the indicator is a cookie including information about the user.

6. The apparatus of claim 1, wherein information about a user includes product interests of the user, and being operable to generate an offer includes being operable to:
   compare the product interests of the user to the product information stored in the storage element;
   based on the comparison, identify, from the plurality of products offered for sale by the plurality of sellers, a product which the user has expressed an interest in or a product related to the product which the user has expressed an interest in; and
   generate the offer based on the identified product or related product.

7. The apparatus of claim 6, wherein the product information further includes, for each product, product availability, and being operable to generate the offer includes being operable to:
   generate the offer based on the product price for the identified product and the product availability for the identified product.

8. The apparatus of claim 1, wherein the customized offer is available to the user only for a predetermined time.

9. The apparatus of claim 8, wherein the predetermined time expires:
   after a certain amount of time;
   when a web banner previously displayed to the user is no longer displayed to the user; or
   when the user indicates a refusal of the offer.

10. The apparatus of claim 1, wherein being operable to communicate the customized offer to the user includes being operable to provide the customized offer for display in a web banner on the end user computing device.

11. The apparatus of claim 10, wherein the user may accept the offer only by activating the web banner.

12. The apparatus of claim 10, wherein once the offer is accepted by the user, subsequent processing for fulfilling the offer is also performed within the web banner.

13. The apparatus of claim 1, wherein:
   being operable to acquire information about a user includes being operable to acquire information about a plurality of users of end user computing devices; and
   being operable to identify the user includes being operable to identify one of the plurality of users.

14. The apparatus of claim 13, wherein the processor is further operable to:
   segment the plurality of users into categories based on the acquired information; and
   assign a value indicator to each of the categories.

15. The apparatus of claim 14, wherein being operable to generate an offer includes being operable to generate an offer based on the value indicator.

16. The apparatus of claim 1, wherein the processor is further operable to:
   receive an indicator indicating whether or not the user accepted the customized offer; and
   store acceptance information based on the received indicator, the acceptance information identifying whether or not the user accepted the customized offer.

17. The apparatus of claim 16, wherein the processor is further operable to generate a subsequent offer based on previous offer acceptance information.

18. A method of generating a customized offer, comprising:
- acquiring, by a server computer, information about a user of an end user computing device, the server computer being operable to store:
  - product information for a plurality of products offered for sale by a plurality of sellers, the product information including, for each product, a product price and a product description;
  - buyer information for a plurality of buyers of the products offered for sale, the buyer information including, for each buyer, a buyer identifier identifying the buyer, contact information indicating information for contacting the buyer, and billing information for the buyer; and
  - seller information for the sellers, the seller information including, for each seller, a seller identifier identifying the seller, contact information indicating information for contacting the seller, and billing information for the seller;
- determining a likelihood that the user is in possession or control of one of the plurality of products offered for sale by the sellers;
- identifying, by the server computer, the user from the buyers and the sellers when the user accesses a third party web site hosted by a server different than the server computer;
- in response to identifying the user, generating an offer for a sale or purchase of at least one of the products offered for sale using at least some of the acquired information about the user and the product information stored in the storage element, the offer being customized for the user, wherein generating the offer for a sale or purchase of at least one of the products offered for sale includes generating, based on the likelihood that the user is in possession or control of one or more of the products offered for sale by the sellers, an offer that solicits the user to sell the product that they are in possession or control of; and
- communicating the customized offer to the user.

19. A non-transitory computer-readable storage medium with an executable program stored thereon, wherein the program instructs a microprocessor to perform the following steps:
- acquire, at a marketplace server, information about a user of an end user computing device different than the marketplace server, the marketplace server being operable to store:
  - product information for a plurality of products offered for sale by a plurality of sellers, the product information including, for each product, a product price and a product description;
  - buyer information for a plurality of buyers of the products offered for sale, the buyer information including, for each buyer, a buyer identifier identifying the buyer, contact information indicating information for contacting the buyer, and billing information for the buyer; and
  - seller information for the sellers, the seller information including, for each seller, a seller identifier identifying the seller, contact information indicating information for contacting the seller, and billing information for the seller;
- determine a likelihood that the user is in possession or control of one of the plurality of products offered for sale by the sellers;
- identify the user from the buyers and the sellers when the user accesses a third party web site hosted by a server different than the marketplace server;
- in response to identifying the user, generate an offer for a sale or purchase of at least one of the products offered for sale using at least some of the acquired information about the user and the product information stored in the storage element, the offer being customized for the user, wherein generate an offer for a sale or purchase of at least one of the products offered for sale includes generate, based on the likelihood that the user is in possession or control of one or more of the products offered for sale by the sellers, an offer that solicits the user to sell the product that they are in possession or control of; and
- communicate the customized offer to the user.

20. The method of claim 18, wherein information about a user includes product interests of the user, and generating an offer includes:
- comparing the product interests of the user to the product information for the plurality of products offered for sale by the plurality of sellers;
- based on the comparison, identifying, from the plurality of products offered for sale by the plurality of sellers, a product which the user has expressed an interest in or a product related to the product which the user has expressed an interest in; and
- generating the offer based on the identified product or related product.

21. The method of claim 20, wherein the product information further includes, for each product, product availability, and generating the offer includes:
- generating the offer based on the product price for the identified product and the product availability for the identified product.

22. The method of claim 18, wherein:
- the server computer is further operable to store, for each of the plurality of products, an image associated with the product, a textual description of the product, a retail price of the product, a breakeven price of the product, a disposal price of the product, an indication of whether the product is in stock, and an indication as to how many days the product has been in stock; and
- generating an offer includes generating an offer based on the textual description of the product, the retail price of the product, the breakeven price of the product, the disposal price of the product, the indication of whether the product is in stock, and the indication as to how many days the product has been in stock.

23. The method of claim 18, wherein communicating the customized offer to the user includes providing the customized offer for display in a web banner on the end user computing device.

24. The method of claim 23, further comprising:
- receiving an indication that the user accepted the customized offer; and
- in response to receiving the indication that the user accepted the customized offer, causing additional information to be displayed within the web banner displayed on the end user computing device, the additional information facilitating fulfillment of the customized offer that was accepted by the user.

25. The method of claim 24, further comprising:
- in response to receiving the indication that the user accepted the customized offer:
- receiving, at the server computer, contact information from the user via the web banner;

receiving, at the server computer, shipping information from the user via the web banner;

receiving, at the server computer, billing information from the user via the web banner; and receiving, at the server computer, from the user via the web banner, a purchase order for the product identified by the customized offer.

\* \* \* \* \*